United States Patent
Raghavan et al.

(10) Patent No.: US 12,149,316 B2
(45) Date of Patent: Nov. 19, 2024

(54) BEAM SWITCHING AND ANTENNA ARRAY CONFIGURATIONS FOR NEAR FIELD COMMUNICATIONS

(71) Applicant: QUALCOMM Incorporated, San Diego, CA (US)

(72) Inventors: Vasanthan Raghavan, West Windsor Township, NJ (US); Juergen Cezanne, Ocean Township, NJ (US); Mohammad Ali Tassoudji, San Diego, CA (US); Yu-Chin Ou, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 8 days.

(21) Appl. No.: 18/305,067

(22) Filed: Apr. 21, 2023

(65) Prior Publication Data
US 2024/0356612 A1    Oct. 24, 2024

(51) Int. Cl.
*H04B 7/06*    (2006.01)

(52) U.S. Cl.
CPC ......... *H04B 7/0634* (2013.01); *H04B 7/0686* (2013.01)

(58) Field of Classification Search
CPC ............................ H04B 7/0634; H04B 7/0686
USPC ........................................................ 375/262
See application file for complete search history.

(56) References Cited

U.S. PATENT DOCUMENTS

| 11,569,883 | B2 * | 1/2023 | Cha ........................ H04B 7/088 |
| 2023/0412239 | A1 * | 12/2023 | Zhou .................... H04B 7/0695 |
| 2024/0030994 | A1 | 1/2024 | Zhao et al. |

FOREIGN PATENT DOCUMENTS

WO    WO-2022228003 A1    11/2022

OTHER PUBLICATIONS

Partial International Search Report—PCT/US2024/021296—ISA/EPO—Jul. 15, 2024.

* cited by examiner

*Primary Examiner* — Fitwi Y Hailegiorgis
(74) *Attorney, Agent, or Firm* — Kevin M. Donnelly; Norton Rose Fulbright US LLP

(57) ABSTRACT

This disclosure provides systems, methods, apparatuses, and computer programs encoded on computer storage media, for wireless communication. Various aspects support beam switching and changing antenna array configurations for communicating in a near field range. In some examples, a user equipment (UE) may transmit a beam group indicator to a network entity, and the UE and the network entity may perform beam switching operations associated with switch communication beams in association with changes to a distance between the UE and the network entity. In some such examples, the beam switching may switch from using beam weights for communications in a far field range to beam weights for communications in a near field range. Additionally or alternatively, the network entity may change configurations of an antenna array used to communicate with the UE in association with changes to the distance. Other aspects and features are also claimed and described.

30 Claims, 10 Drawing Sheets

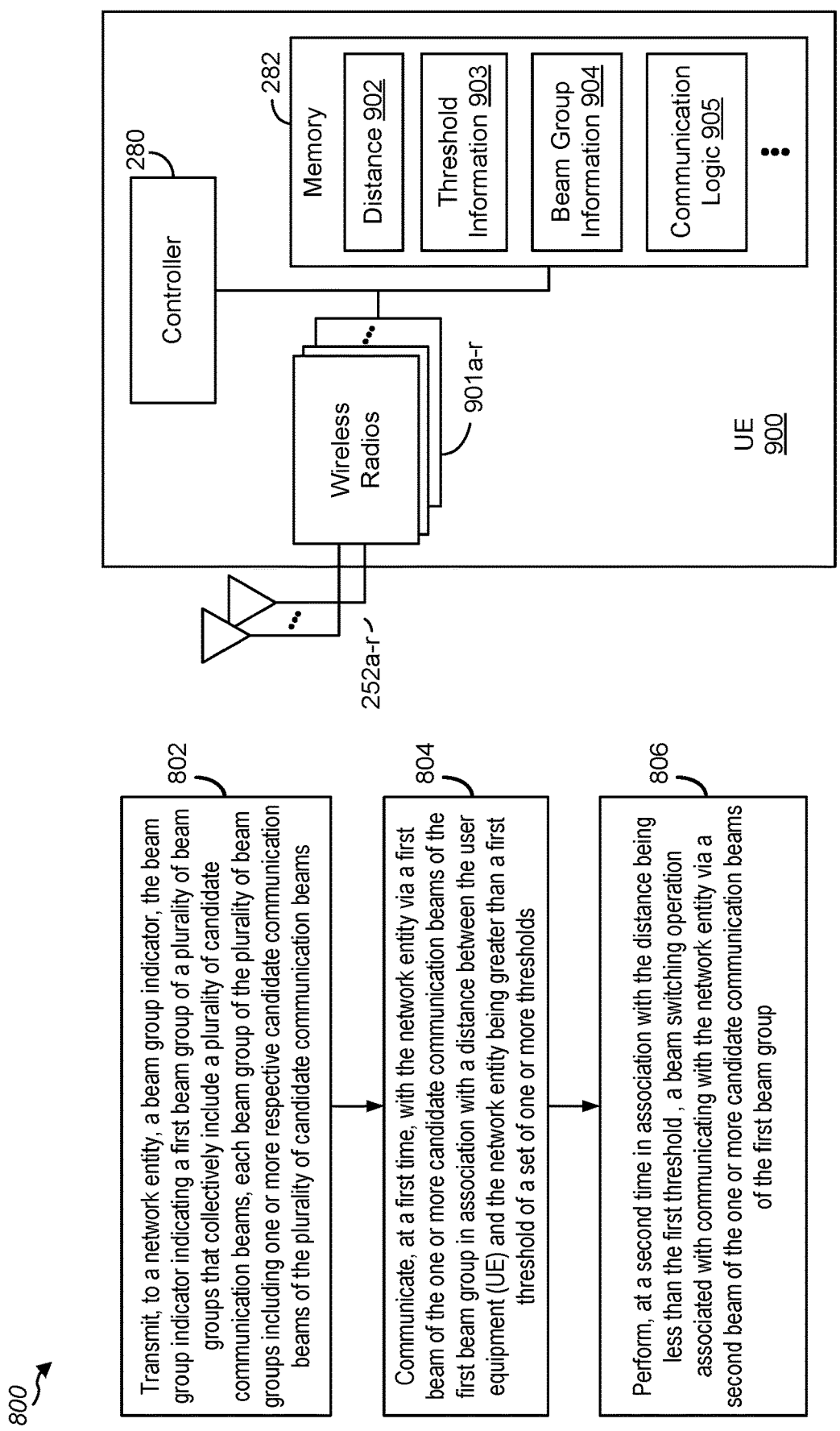

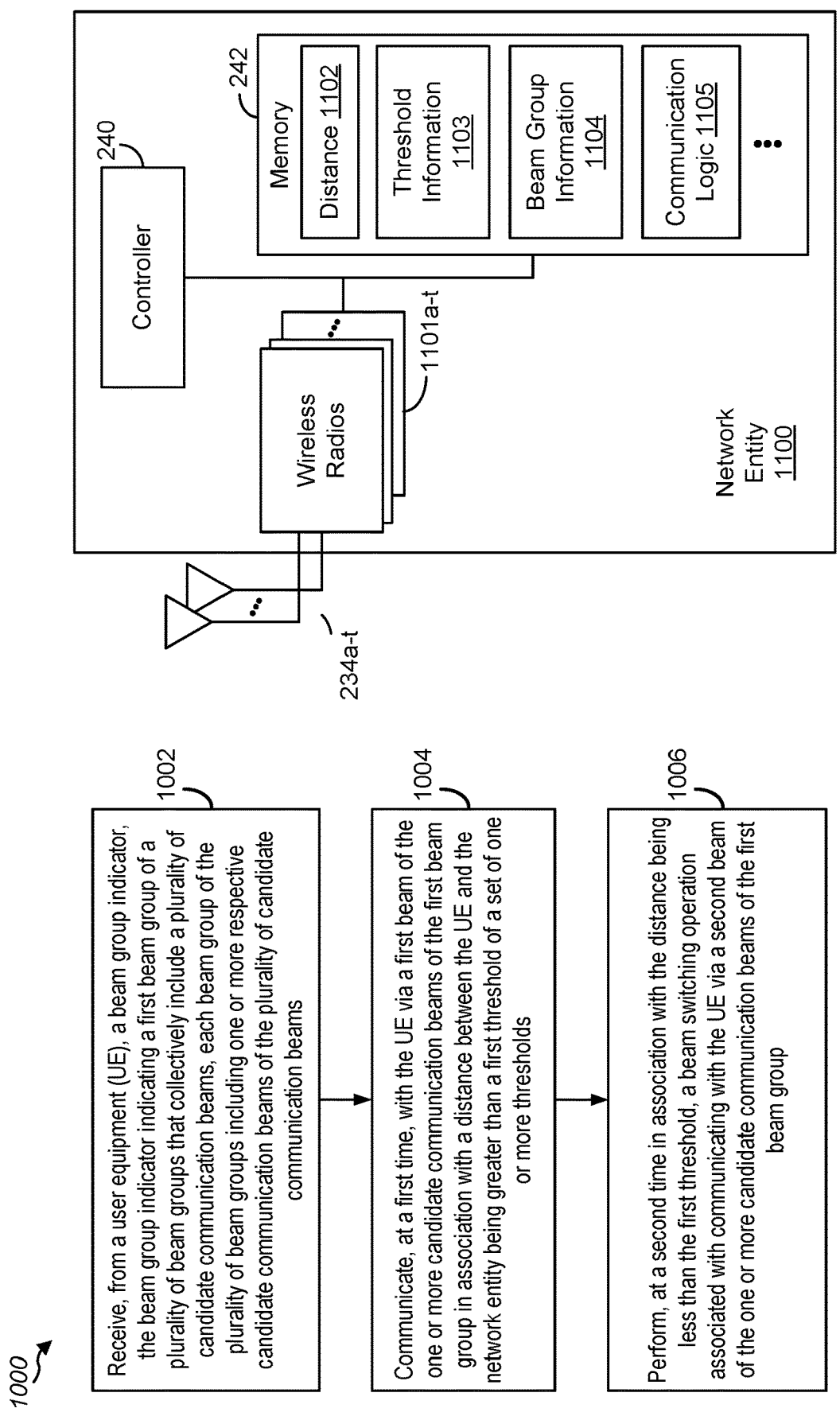

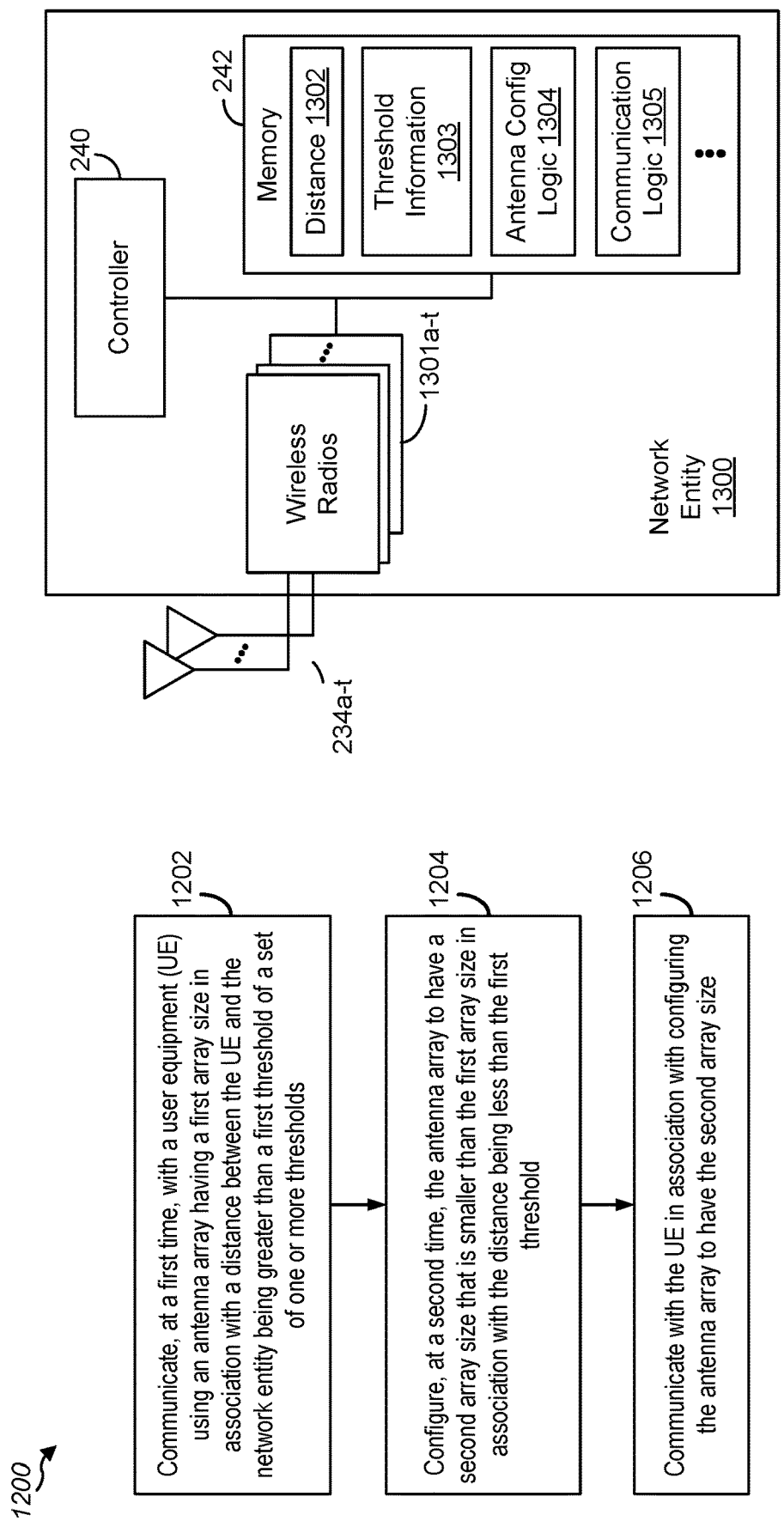

BEAM SWITCHING AND ANTENNA ARRAY CONFIGURATIONS FOR NEAR FIELD COMMUNICATIONS

TECHNICAL FIELD

Aspects of the present disclosure relate generally to wireless communication, and more specifically, to switching beams and configuring antenna arrays in association with changing from communicating using far field techniques to communicating using near field techniques, or from communicating using near field techniques to communicating using far field techniques.

DESCRIPTION OF THE RELATED TECHNOLOGY

Wireless communications systems are widely deployed to provide various types of communication content such as voice, video, packet data, messaging, broadcast, and so on. A wireless multiple-access communications system may include a number of base stations or network access nodes, each simultaneously supporting communication for multiple communication devices, which may be otherwise known as user equipment (UE). These systems may be capable of supporting communication with multiple UEs by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

As wireless communications technology advances in higher frequency band carrier frequencies, such as the "millimeter wave" band from 24.25 gigahertz (GHz)-52.6 GHz and beyond, wireless communication devices are being designed with larger and more complicated antennas and antenna arrays. To illustrate, wireless communication devices often include antenna arrays having multiple antenna elements instead of a single antenna. For example, UEs may have antenna arrays that include two or four antenna elements, such as 2×2, 4×1, or 2×1 antenna arrays, and base stations may have larger antenna arrays that include even more antenna elements, such as 16×4 or 8×4 antenna arrays, with plans to incorporate 64×4, 64×8, 64×16, 128×4, or 128×8 antenna arrays. These antenna arrays are also being designed to perform communications in higher frequency bands, such as frequencies above 24.25 GHz, which encompass a frequency range beyond FR2 (also referred to as the millimeter wave band). As antenna arrays become larger and are designed for higher frequency communication, the Fraunhofer distance that captures the distinctive behavior between near and far fields becomes larger. Because the Fraunhofer distance corresponds to a threshold distance between the near field and the far field with respect to the antenna array, increasing the Fraunhofer distance increases the size of a region surrounding a base station in which other devices, such as UEs, experience near field behavior with respect to the antenna array of the base station. As an example, an antenna array having 64 antenna elements and designed for communicating at 30 GHz may have a Fraunhofer distance of approximately 20.5 meters, such that any UE within 20.5 meters of the base station may experience near field effects.

Because beam weights used by a base station and a UE are typically designed to enable steering of energy in the channel between the UE and the base station based on far field effects or assumptions, communication performance and energy harvesting performance may be degraded responsive to the base station transitioning from communicating using far field techniques to communicating using near field techniques. Although the communication performance degradation may be ameliorated in part by the decrease in propagation loss as the UE moves closer to the base station, the energy harvesting performance degradation is not reduced by the decrease in the propagation loss, resulting in a noticeable degradation in energy harvesting performance by UEs that are closer to the base station.

SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later. The systems, methods and devices of this disclosure each have several innovative aspects, no single one of which is solely responsible for the desirable attributes disclosed herein.

One innovative aspect of the subject matter described in this disclosure can be implemented in a user equipment (UE). The UE includes one or more memories storing processor-readable code and one or more processors coupled with the one or more memories and operable to cause the UE to transmit, to a network entity, a beam group indicator. The beam group indicator indicates a first beam group of a plurality of beam groups that collectively include a plurality of candidate communication beams. Each beam group of the plurality of beam groups includes one or more respective candidate communication beams of the plurality of candidate communication beams. The one or more processors are also operable to cause the UE to communicate, at a first time, with the network entity via a first beam of the one or more candidate communication beams of the first beam group in association with a distance between the UE and the network entity being greater than a first threshold of a set of one or more thresholds. The one or more processors are further operable to cause the UE to perform, at a second time in association with the distance being less than the first threshold, a beam switching operation associated with communicating with the network entity via a second beam of the one or more candidate communication beams of the first beam group.

Another innovative aspect of the subject matter described in this disclosure can be implemented in a method for wireless communication performed by a UE. The method includes transmitting, to a network entity, a beam group indicator. The beam group indicator indicates a first beam group of a plurality of beam groups that collectively include a plurality of candidate communication beams. Each beam group of the plurality of beam groups includes one or more respective candidate communication beams of the plurality of candidate communication beams. The method also includes communicating, at a first time, with the network entity via a first beam of the one or more candidate communication beams of the first beam group in association with a distance between the UE and the network entity being greater than a first threshold of a set of one or more thresholds. The method further includes performing, at a second time in association with the distance being less than the first threshold, a beam switching operation associated with communicating with the network entity via a second beam of the one or more candidate communication beams of the first beam group.

Another innovative aspect of the subject matter described in this disclosure can be implemented in a network entity. The network entity includes one or more memories storing processor-readable code and one or more processors coupled with the one or more memories and operable to cause the network entity to receive, from a UE, a beam group indicator. The beam group indicator indicates a first beam group of a plurality of beam groups that collectively include a plurality of candidate communication beams. Each beam group of the plurality of beam groups includes one or more respective candidate communication beams of the plurality of candidate communication beams. The one or more processors are also operable to cause the network entity to communicate, at a first time, with the UE via a first beam of the one or more candidate communication beams of the first beam group in association with a distance between the UE and the network entity being greater than a first threshold of a set of one or more thresholds. The one or more processors are further operable to cause the network entity to perform, at a second time in association with the distance being less than the first threshold, a beam switching operation associated with communicating with the UE via a second beam of the one or more candidate communication beams of the first beam group.

Another innovative aspect of the subject matter described in this disclosure can be implemented in a method for wireless communication performed by a network entity. The method includes receiving, from a UE, a beam group indicator. The beam group indicator indicates a first beam group of a plurality of beam groups that collectively include a plurality of candidate communication beams. Each beam group of the plurality of beam groups includes one or more respective candidate communication beams of the plurality of candidate communication beams. The method also includes communicating, at a first time, with the UE via a first beam of the one or more candidate communication beams of the first beam group in association with a distance between the UE and the network entity being greater than a first threshold of a set of one or more thresholds. The method further includes performing, at a second time in association with the distance being less than the first threshold, a beam switching operation associated with communicating with the UE via a second beam of the one or more candidate communication beams of the first beam group.

Another innovative aspect of the subject matter described in this disclosure can be implemented in a network entity. The network entity includes one or more memories storing processor-readable code and one or more processors coupled with the one or more memories and operable to cause the network entity to communicate, at a first time, with a UE using an antenna array having a first array size in association with a distance between the UE and the network entity being greater than a first threshold of a set of one or more thresholds. The one or more processors are also operable to cause the network entity to configure, at a second time, the antenna array to have a second array size that is smaller than the first array size in association with the distance being less than the first threshold. The one or more processors are further operable to cause the network entity to communicate with the UE in association with configuring the antenna array to have the second array size.

Another innovative aspect of the subject matter described in this disclosure can be implemented in a method for wireless communication performed by a network entity. The method includes communicating, at a first time, with a UE using an antenna array having a first array size in association with a distance between the UE and the network entity being greater than a first threshold of a set of one or more thresholds. The method also includes configuring, at a second time, the antenna array to have a second array size that is smaller than the first array size in association with the distance being less than the first threshold. The method further includes communicating with the UE in association with configuring the antenna array to have the second array size.

Other aspects, features, and implementations of the present disclosure will become apparent to a person having ordinary skill in the art, upon reviewing the following description of specific, example implementations of the present disclosure in conjunction with the accompanying figures. While features of the present disclosure may be described relative to particular implementations and figures below, all implementations of the present disclosure can include one or more of the advantageous features described herein. In other words, while one or more implementations may be described as having particular advantageous features, one or more of such features may also be used in accordance with the various implementations of the disclosure described herein. In similar fashion, while example implementations may be described below as device, system, or method implementations, such example implementations can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label. Note that the relative dimensions of the following figures may not be drawn to scale.

FIG. 8 is a flow diagram illustrating an example process performable by a UE that supports improved near field communications, particularly via beam switching, according to one or more aspects.

FIG. 9 is a block diagram of an example UE that supports improved near field communications, particularly via beam switching, according to one or more aspects.

FIG. 10 is a flow diagram illustrating an example process performable by a network entity that supports improved near field communications, particularly via beam switching, according to one or more aspects.

FIG. 11 is a block diagram of an example network entity that supports improved near field communications, particularly via beam switching, according to one or more aspects.

FIG. 12 is a flow diagram illustrating an example process performable by a network entity that supports improved near field communications, particularly via changing antenna array configurations, according to one or more aspects.

FIG. 13 is a block diagram of an example network entity that supports improved near field communications, particularly via changing antenna array configurations, according to one or more aspects.

Like reference numbers and designations in the various drawings indicate like elements.

DETAILED DESCRIPTION

Figure 1:
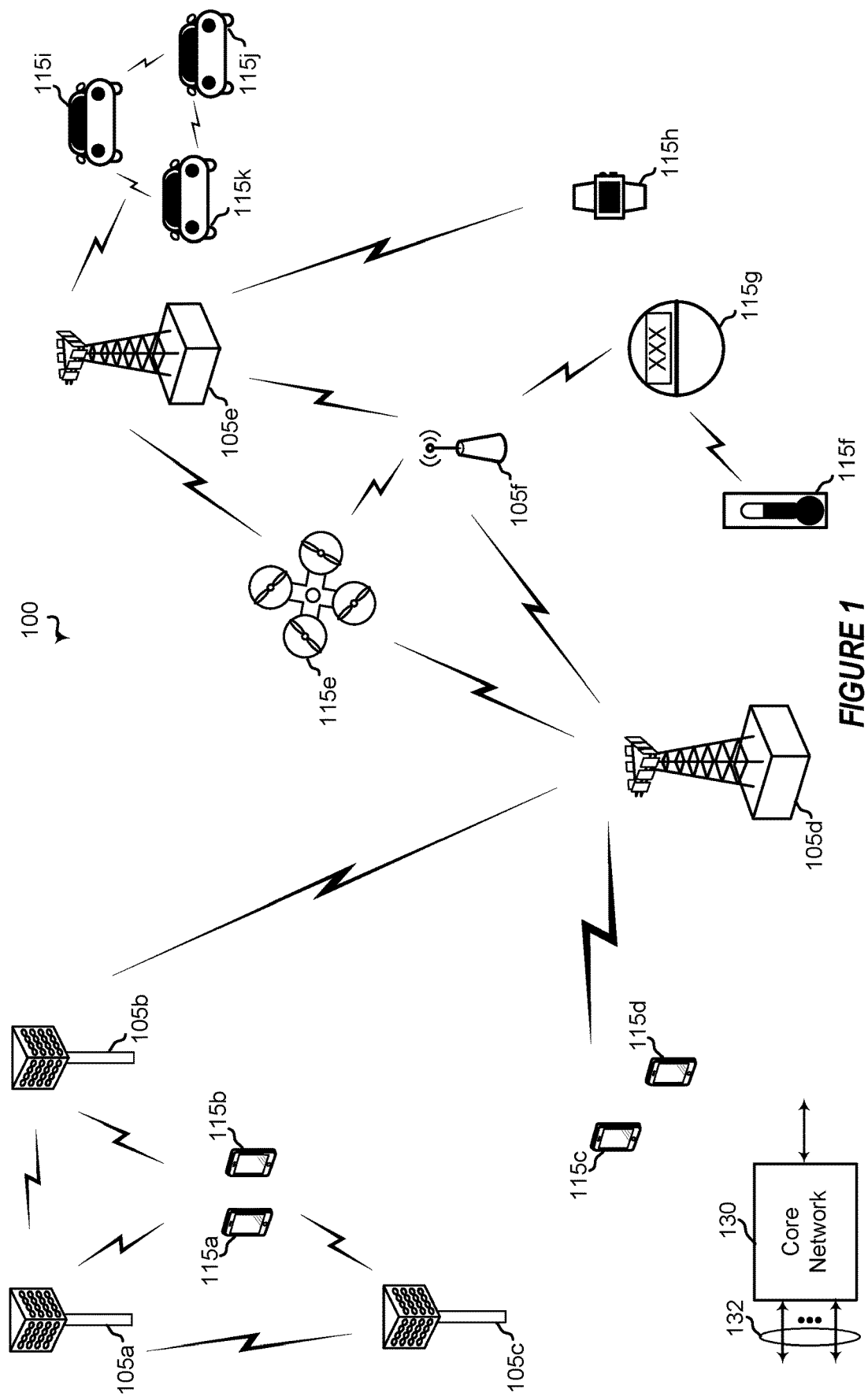
FIG. 1 is a block diagram illustrating details of an example wireless communication system according to one or more aspects.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

The electromagnetic spectrum is often subdivided, based on frequency (or wavelength), into various classes, bands or channels. In fifth generation (5G) new radio (NR), two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band (or spectrum) in documents and articles, despite being different than the extremely high frequency (EHF) band (30 GHz-300 GHz) which is identified by the International Telecommunications Union (ITU) as a "millimeter wave" band. With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Additional operating bands have been proposed and are beginning to be referred to in various documents and articles as FR3 (7.125 GHz to 24.25 GHz), which is between FR1 and FR2, and FR4 (52.6 GHz to 114.25 GHz).

Various aspects relate generally to wireless communication, and more particularly, to switching beams and configuring antenna arrays in association with changing from communicating using far field techniques to communicating using near field techniques. Some aspects more specifically relate to performing distance-based beam switching or operation mode-based beam switching, or to distance-based modifications of antenna array configurations, to leverage differences in wireless signal properties at different distances. In some examples, a user equipment (UE) and a network entity, such as a base station, may negotiate the assignment of various candidate communication beams to beam groups such that the UE may select a beam group and, as a distance between the UE and the network entity changes, the UE and the network entity may perform beam switching to change between different candidate communication beams in association with the relationship between the distance and one or more thresholds. Additionally or alternatively, in some examples, a network entity, such as a base station, may change a configuration of an antenna array, and optionally a gain setting of a power amplifier, in association with the relationship between the distance and one or more thresholds. Additionally or alternatively, in some examples, the beam switching or the change in antenna array configuration may be in association with changing an operating mode of the UE, particularly a transition to an energy harvesting mode. To support distance-based beam switching, a UE may transmit a beam group indicator to a network entity to indicate a selected beam group of a plurality of beam groups that collectively include a plurality of candidate communication beams. As the UE moves about a cell or coverage area supported by the network entity, the UE and the network entity may perform beam switching operations associated with switching from communicating via one beam to communicating with another beam in association with changes to a distance between the UE and the network entity. As an illustrative example, in association with the distance falling below a threshold that corresponds to a Fraunhofer distance from an antenna array of the network entity, each of the UE and the network entity may perform respective beam switching operations to switch communication beams from the selected beam group. For example, the UE and the network entity may switch from using beams that are associated with a set of beam weights that are designed or tailored for use in communicating in a far field range to beams that are associated with a set of beam weights that are designed or tailored for use in communicating in a near field range. Additionally or alternatively, the network entity may change a configuration of the antenna array, and optionally a gain of the power amplifier, in association with the distance falling below the threshold, or the beam switching or changing the array configuration may be performed based on changing an operating mode at the UE.

Particular aspects of the subject matter described in this disclosure can be implemented to realize one or more of the following potential advantages. In some examples, by performing distance-based or energy harvesting mode-based beam switching or changing of an array configuration, the described techniques can be used to improve energy harvesting performance or communication performance at smaller distances between devices. By performing the beam switching or changing the antenna array configuration to leverage near field communication techniques in association with the UE moving closer to the network entity, the UE and the network entity may perform communications with increased available energy that enables improved energy harvesting at the UE as compared to communicating using far field communication techniques. As an illustrative example, performing beam switching from a first communication beam associated with beam weights designed or tailored for communications in a far field range (for example, using a far field codebook) to a second communication beam associated with beam weights designed or tailored for communications in a near field range (for example, using a near field codebook) when the UE and the network entity are separated by a distance that is less than a Fraunhofer distance associated with the antenna array may result in an increase in available energy in for energy harvesting of approximately 3.3-5.9 decibels (dBs) for a 4×4 antenna array having single or dual polarity.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably. In some implementations, two or more wireless communications systems, also referred to as wireless communications networks, may be configured to provide or participate in authorized shared access between the two or more wireless communications systems.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM or GSM EDGE, together with the network that joins the base stations (for example, the Ater and Abis interfaces, among other examples) and the base station controllers (for example, A interfaces, among other examples). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may include one or more GERANs, which may be coupled with UTRANs in the case of a UMTS or GSM network. Additionally, an operator network may include one or more LTE networks, or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named the "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, 5G, or NR technologies; however, the description is not intended to be limited to a specific technology or application, and one or more aspects described with reference to one technology may be understood to be applicable to another technology. Indeed, one or more aspects the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (such as ~1M nodes per km2), ultra-low complexity (such as ~10 s of bits per sec), ultra-low energy (such as ~10+ years of battery life), and deep coverage with the capability to reach challenging locations; (2) including mission-critical control with strong security to safeguard sensitive personal, financial, or classified information, ultra-high reliability (such as ~99.9999% reliability), ultra-low latency (such as ~1 millisecond (ms)), and users with wide ranges of mobility or lack thereof; and (3) with enhanced mobile broadband including extreme high capacity (such as ~10 Tbps per km2), extreme data rates (such as multi-Gbps rate, 100+ Mbps user experienced rates), and deep awareness with advanced discovery and optimizations.

5G NR devices, networks, and systems may be implemented to use optimized OFDM-based waveform features.

These features may include scalable numerology and transmission time intervals (TTIs); a common, flexible framework to efficiently multiplex services and features with a dynamic, low-latency time division duplex (TDD) or frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80 or 100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

FIG. 1 is a block diagram illustrating details of an example wireless communication system. The wireless communication system may include wireless network 100. The wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements, such as device-to-device, peer-to-peer or ad hoc network arrangements, among other examples.

The wireless network 100 illustrated in FIG. 1 includes a number of base stations 105 and other network entities. A base station may be a station that communicates with the UEs and may be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station or a base station subsystem serving the coverage area, depending on the context in which the term is used. In implementations of the wireless network 100 herein, the base stations 105 may be associated with a same operator or different operators, such as the wireless network 100 may include a plurality of operator wireless networks. Additionally, in implementations of the wireless network 100 herein, the base stations 105 may provide wireless communications using one or more of the same frequencies, such as one or more frequency bands in licensed spectrum, unlicensed spectrum, or a combination thereof, as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area, such as several kilometers in radius, and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area, such as a home, and, in addition to unrestricted access, may provide restricted access by UEs having an association with the femto cell, such as UEs in a closed subscriber group (CSG), UEs for users in the home, and the like. A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple cells, such as two cells, three cells, four cells, and the like.

The wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

The UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may include implementations of one or more of the UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, a gesture tracking device, a medical device, a digital audio player (such as MP3 player), a camera or a game console, among other examples; and digital home or smart home devices such as a home audio, video, and multimedia device, an appliance, a sensor, a vending machine, intelligent lighting, a home security system, or a smart meter, among other examples. In one aspect, a UE may be a device that includes a Universal Integrated Circuit Card (UICC). In another aspect, a UE may be a device that does not include a UICC. In some aspects, UEs that do not include UICCs may be referred to as IoE devices. The UEs 115a-115d of the implementation illustrated in FIG. 1 are examples of mobile smart phone-type devices accessing the wireless network 100. A UE may be a machine specifically configured for connected communication, including machine type communication (MTC), enhanced MTC (eMTC), narrowband IoT (NB-IoT) and the like. The UEs 115e-115k illustrated in FIG. 1 are examples of various machines configured for communication that access 5G network 100.

A mobile apparatus, such as the UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. Backhaul communication between base stations of the wireless network 100 may occur using wired or wireless communication links.

In operation at the 5G network 100, the base stations 105a-105c serve the UEs 115a and 115b using 3D beamforming and coordinated spatial techniques, such as coordinated multipoint (CoMP) or multi-connectivity. Macro base station 105d performs backhaul communications with the base stations 105a-105c, as well as small cell, the base station 105f. Macro base station 105d also transmits multicast services which are subscribed to and received by the UEs 115c and 115d. Such multicast services may include mobile television or stream video, or may include other services for providing community information, such as weather emergencies or alerts, such as Amber alerts or gray alerts.

The wireless network 100 of implementations supports mission critical communications with ultra-reliable and redundant links for mission critical devices, such the UE 115e, which is a drone. Redundant communication links with the UE 115e include from the macro base stations 105d and 105e, as well as small cell base station 105f. Other machine type devices, such as UE 115f (thermometer), the UE 115g (smart meter), and the UE 115h (wearable device) may communicate through the wireless network 100 either directly with base stations, such as the small cell base station 105f, and the macro base station 105e, or in multi-hop configurations by communicating with another user device which relays its information to the network, such as the UE 115f communicating temperature measurement information to the smart meter, the UE 115g, which is then reported to the network through the small cell base station 105f. The 5G network 100 may provide additional network efficiency through dynamic, low-latency TDD or FDD communications, such as in a vehicle-to-vehicle (V2V) mesh network between the UEs 115i-115k communicating with the macro base station 105e.

Figure 2:
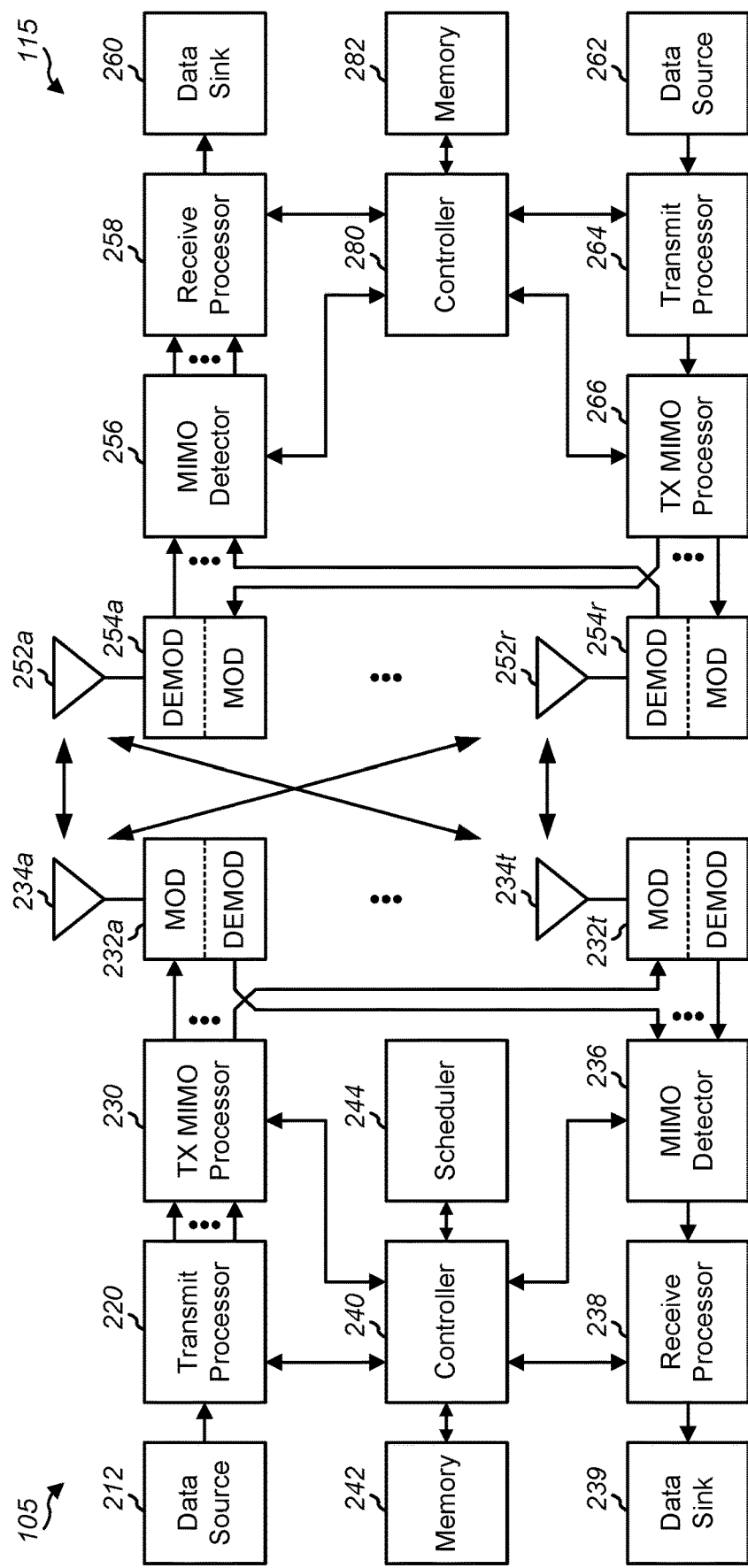
FIG. 2 is a block diagram illustrating examples of a base station and a user equipment (UE) according to one or more aspects.

FIG. 2 is a block diagram conceptually illustrating an example design of a base station 105 and a UE 115. The base station 105 and the UE 115 may be one of the base stations and one of the UEs in FIG. 1. For a restricted association scenario (as mentioned above), the base station 105 may be the small cell base station 105f in FIG. 1, and the UE 115 may be the UE 115c or 115d operating in a service area of the base station 105f, which in order to access the small cell base station 105f, would be included in a list of accessible UEs for the small cell base station 105f. Additionally, the base station 105 may be a base station of some other type. As shown in FIG. 2, the base station 105 may be equipped with antennas 234a through 234t, and the UE 115 may be equipped with antennas 252a through 252r for facilitating wireless communications.

At the base station 105, a transmit processor 220 may receive data from a data source 212 and control information from a controller 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), or MTC physical downlink control channel (MPDCCH), among other examples. The data may be for the PDSCH, among other examples. The transmit processor 220 may process, such as encode and symbol map, the data and control information to obtain data symbols and control symbols, respectively. Additionally, the transmit processor 220 may generate reference symbols, such as for the primary synchronization signal (PSS) and secondary synchronization signal (SSS), and cell-specific reference signal. Transmit (TX) multiple-input multiple-output (MIMO) processor 230 may perform spatial processing on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream, such as for OFDM, among other examples, to obtain an output sample stream. Each modulator 232 may additionally or alternatively process the output sample stream to obtain a downlink signal. For example, to process the output sample stream, each modulator 232 may convert to analog, amplify, filter, and upconvert the output sample stream to obtain the downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition a respective received signal to obtain input samples. For example, to condition the respective received signal, each demodulator 254 may filter, amplify, downconvert, and digitize the respective received signal to obtain the input samples. Each demodulator 254 may further process the input samples, such as for OFDM, among other examples, to obtain received symbols. MIMO detector 256 may obtain received symbols from demodulators 254a through 254r, perform MIMO detection on the received symbols if applicable, and provide detected symbols. Receive processor 258 may process the detected symbols, provide decoded data for the UE 115 to a data sink 260, and provide decoded control information to a controller 280. For example, to process the detected symbols, the receive processor 258 may demodulate, deinterleave, and decode the detected symbols.

On the uplink, at the UE 115, a transmit processor 264 may receive and process data (such as for the physical uplink shared channel (PUSCH)) from a data source 262 and control information (such as for the physical uplink control channel (PUCCH)) from the controller 280. Additionally, the transmit processor 264 may generate reference symbols for a reference signal. The symbols from the transmit processor 264 may be precoded by TX MIMO processor 266 if applicable, further processed by the modulators 254a through 254r (such as for SC-FDM, among other examples), and transmitted to the base station 105. At base station 105, the uplink signals from the UE 115 may be received by antennas 234, processed by demodulators 232, detected by MIMO detector 236 if applicable, and further processed by receive processor 238 to obtain decoded data and control information sent by the UE 115. The receive processor 238 may provide the decoded data to data sink 239 and the decoded control information to the controller 240.

The controllers 240 and 280 may direct the operation at the base station 105 and the UE 115, respectively. The controller 240 or other processors and modules at the base station 105 or the controller 280 or other processors and modules at the UE 115 may perform or direct the execution of various processes for the techniques described herein, such as to perform or direct the execution illustrated in FIGS. 8, 10, and 12, or other processes for the techniques described herein. The memories 242 and 282 may store data and program codes for the base station 105 and The UE 115, respectively. Scheduler 244 may schedule UEs for data transmission on the downlink or uplink.

In some cases, the UE 115 and the base station 105 may operate in a shared radio frequency spectrum band, which may include licensed or unlicensed, such as contention-based, frequency spectrum. In an unlicensed frequency portion of the shared radio frequency spectrum band, the UEs 115 or the base stations 105 may traditionally perform a medium-sensing procedure to contend for access to the frequency spectrum. For example, the UE 115 or base station 105 may perform a listen-before-talk or listen-before-transmitting (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. In some implementations, a CCA may include detection of specific sequences that indicate use of the channel. For example, another device may transmit a specific preamble prior to transmitting a data sequence. In some cases, an LBT procedure may include a wireless node adjusting its own back off window based on the amount of energy detected on a channel or the acknowledge or negative-acknowledge (ACK or NACK) feedback for its own transmitted packets as a proxy for collisions.

Figure 3:
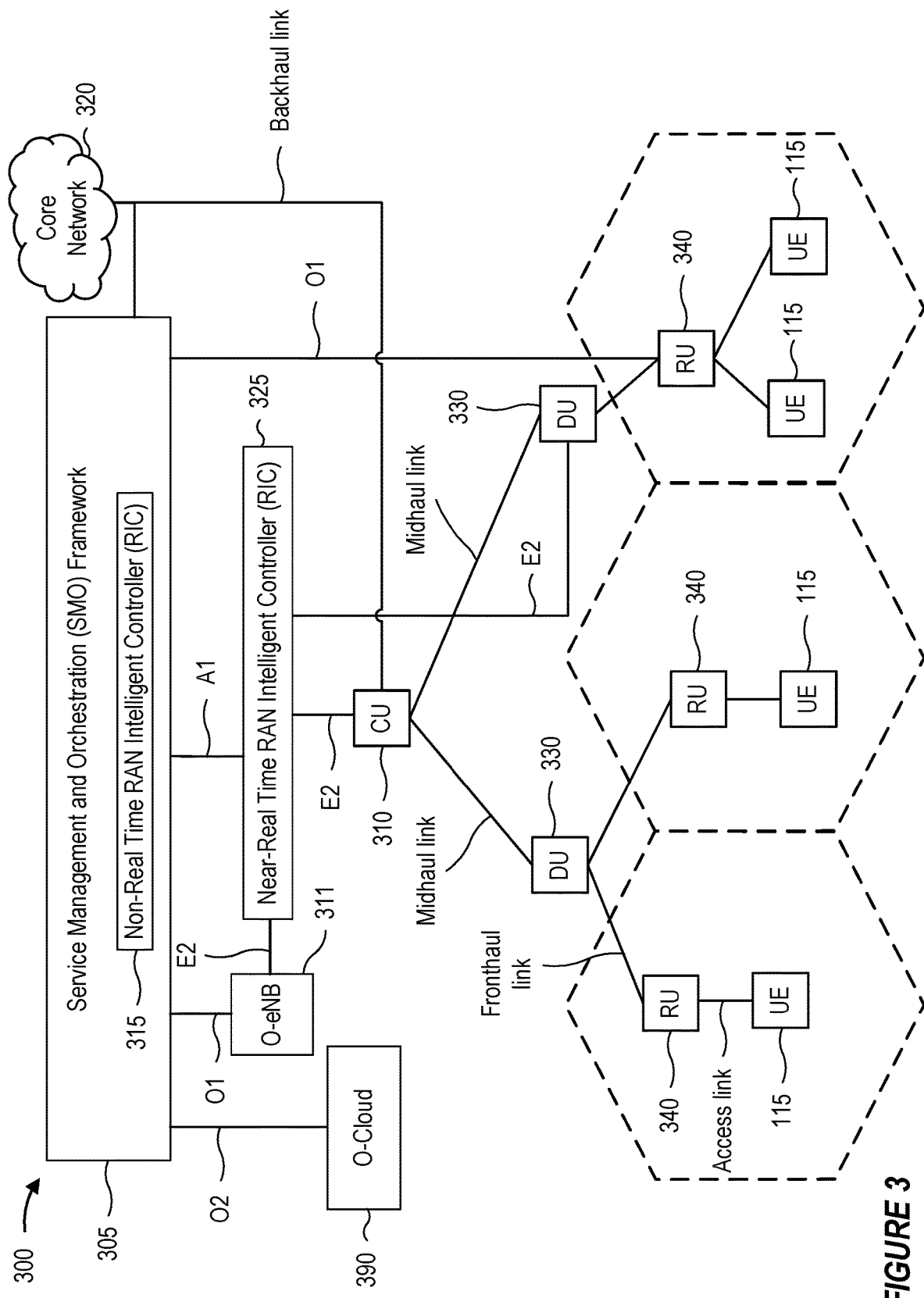
FIG. 3 shows a diagram illustrating an example disaggregated base station architecture according to one or more aspects.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). Core network 320 may include or correspond to core network 130. A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 115 via one or more radio frequency (RF) access links. In some implementations, the UE 115 may be simultaneously served by multiple RUs 340.

Each of the units, i.e., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit—User Plane (CU-UP)), control plane functionality (i.e., Central Unit—Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 115. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As described herein, a node (which may be referred to as a node, a network node, a network entity, or a wireless node) may include, be, or be included in (e.g., be a component of) a base station (e.g., any base station described herein), a transmission and reception point (TRP), a UE (e.g., any UE described herein), a network controller, an apparatus, a device, a computing system, an integrated access and backhauling (IAB) node, a distributed unit (DU), a central unit (CU), a remote unit (RU), a core network, a LFM, and/or a another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first one or more components, a first processing entity, or the like configured to receive the information; and the second network node may refer to a second UE, a second base station, a second apparatus, a second device, a second computing system, a second one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

Figure 4:
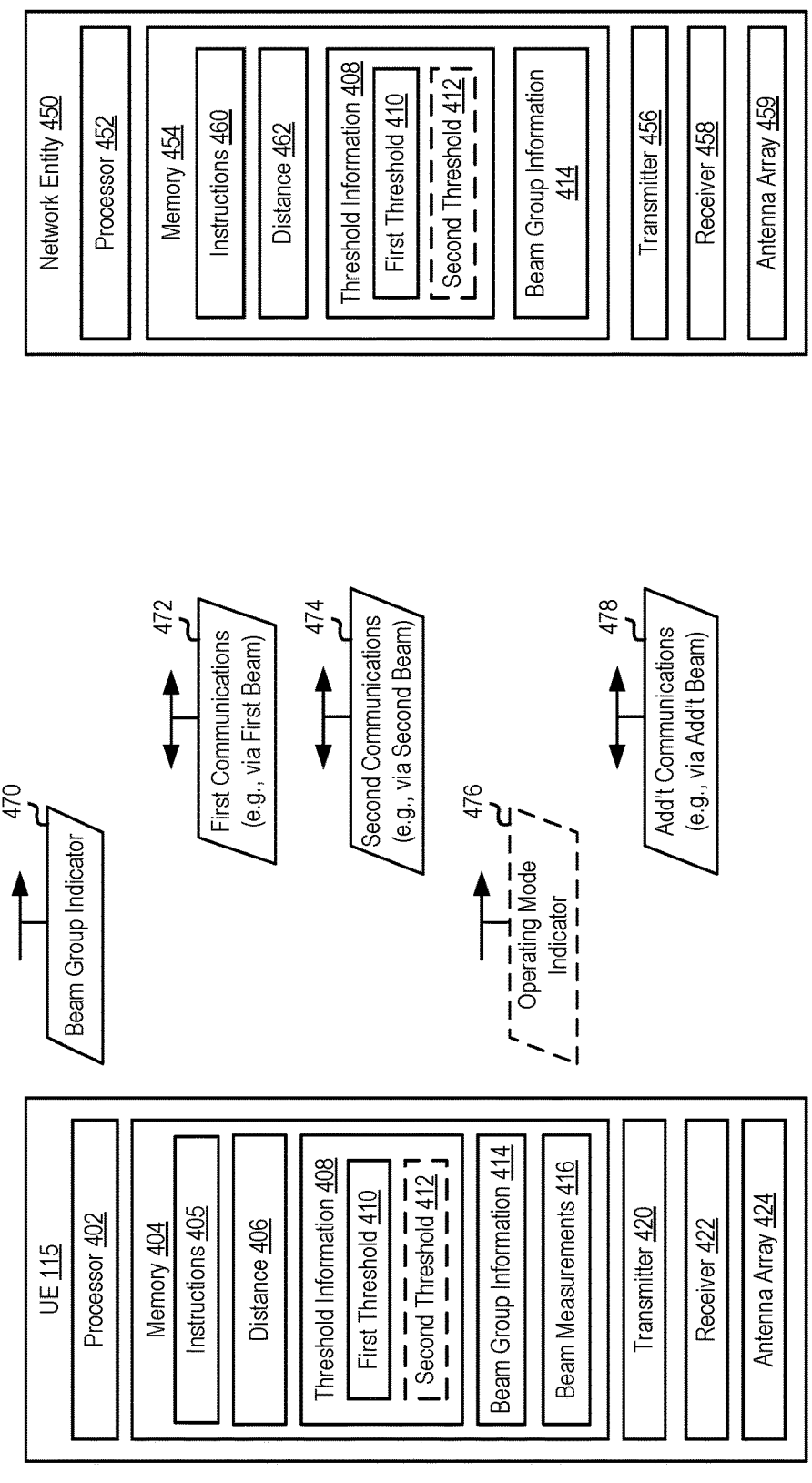
FIG. 4 is a block diagram illustrating an example wireless communication system that supports improved near field communications, particularly via beam switching, according to one or more aspects.

FIG. 4 is a block diagram of an example wireless communications system 400 that supports improved near field communications, particularly via beam switching, according to one or more aspects of the present disclosure. In some examples, the wireless communications system 400 may implement aspects of the wireless network 100. The wireless communications system 400 includes the UE 115 and a network entity 450, such as a base station. Although one UE 115 and one network entity 450 are illustrated, in some other implementations, the wireless communications system 400 may generally include multiple UEs 115, multiple network entities 450, or both.

The UE 115 can include a variety of components (such as structural, hardware components) used for carrying out one or more functions described herein. For example, these components can include one or more processors 402 (hereinafter referred to collectively as "the processor 402"), one or more memory devices 404 (hereinafter referred to collectively as "the memory 404"), one or more transmitters 420 (hereinafter referred to collectively as "the transmitter 420"), one or more receivers 422 (hereinafter referred to collectively as "the receiver 422"), and one or more antenna arrays 424 (hereinafter referred to collectively as "the antenna array 424"). The processor 402 may be configured to execute instructions 405 stored in the memory 404 to perform the operations described herein. In some implementations, the processor 402 includes or corresponds to one or more of the receive processor 258, the transmit processor 264, and the controller 280 of FIG. 2, and the memory 404 includes or corresponds to the memory 282 of FIG. 2.

The memory 404 includes or is configured to store the instructions 405, distance 406, threshold information 408, beam group information 414, and beam measurements 416. The distance 406 represents a distance between the UE 115 and the network entity 450. The distance 406 may be determined by the UE 115 based on positing information, such as global positioning system (GPS) information or GLONASS information, or based on measurements performed by the UE 115 in association with messaging between the UE 115 and the network entity 450, such as round trip time (RTT) measurements. The threshold information 408 indicates one or more thresholds used to perform operations by the UE 115 or the network entity 450, such as one or more distance thresholds. In some implementations, the threshold information 408 indicates a first threshold 410 and a second threshold 412 that is less than the first threshold 410. Although two thresholds are shown in FIG. 4, in other examples, the threshold information 408 may indicate a single threshold or more than two thresholds. The beam group information 414 indicates a plurality of beam groups that collectively include a plurality of candidate communication beams, such as communication beams usable by the antenna array 424 of the UE 115 or the antenna array 459 of the network entity 450. The plurality of candidate communication beams may include TX beams, RX beams, or both. Each beam group of the plurality of beam groups includes one or more respective candidate communication beams of the plurality of candidate communication beams. The beam measurements 416 are associated with measurement operations performed by the UE 115 for one or more communication beams usable by the antenna array 424, as further described herein.

The transmitter 420 is configured to transmit reference signals, control information and data to one or more other devices, and the receiver 422 is configured to receive references signals, synchronization signals, control information and data from one or more other devices. For example, the transmitter 420 may transmit signaling, control information and data to, and the receiver 422 may receive signaling, control information and data from, the network entity 450. In some implementations, the transmitter 420 and the receiver 422 may be integrated in one or more transceivers. Additionally or alternatively, the transmitter 420 or the receiver 422 may include or correspond to one or more components of the UE 115 described with reference to FIG. 2.

The antenna array 424 may be coupled to the transmitter 420, the receiver 422, or a communication interface. The antenna array 424 may include multiple antenna elements configured to perform wireless communications with other devices, such as with the network entity 450. In some implementations, the antenna array 424 may be configured to perform wireless communications using different beams. The beams may include TX beams and RX beams. To illustrate, the antenna array 424 may include multiple independent sets (or subsets) of antenna elements (or multiple individual antenna arrays), and each set of antenna elements of the antenna array 424 may be configured to communicate using a different respective beam that may have a different respective direction than the other beams. For example, a first set of antenna elements of the antenna array 424 may be configured to communicate via a first beam having a first direction, and a second set of antenna elements of the antenna array 424 may be configured to communicate via a second beam having a second direction. In other implementations, the antenna array 424 may be configured to communicate via more than two beams. Alternatively, one or more sets of antenna elements of the antenna array 424 may be configured to concurrently generate multiple beams, for example using multiple RF chains of the UE 115. Each individual set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array 424 may include or correspond to multiple antenna panels, and each antenna panel may be configured to communicate using a different respective beam.

The network entity 450 can include a variety of components (such as structural, hardware components) used for carrying out one or more functions described herein. For example, these components can include one or more processors 452 (hereinafter referred to collectively as "the processor 452"), one or more memory devices 454 (hereinafter referred to collectively as "the memory 454"), one or more transmitters 456 (hereinafter referred to collectively as "the transmitter 456"), one or more receivers 458 (hereinafter referred to collectively as "the receiver 458"), and one or more antenna arrays 459 (hereinafter referred to collectively as "the antenna array 459"). In some implementations, the network entity 450 may include or correspond to the base station 105 described with reference to FIGS. 1 and 2. The processor 452 may be configured to execute instructions 460 stored in the memory 454 to perform the operations described herein. In some implementations, the processor 452 includes or corresponds to one or more of the receive processor 238, the transmit processor 220, and the controller 240 of FIG. 2, and the memory 454 includes or corresponds to the memory 242 of FIG. 2.

The memory 454 includes or is configured to store the instructions 460, distance 462, the threshold information 408, and the beam group information 414. The distance 462 represents a distance between the UE 115 and the network entity 450. The distance 462 may be determined by the network entity 450 based on positing information, such as GPS information or GLONASS information, or based on measurements performed by the network entity 450 in association with messaging between the UE 115 and the network entity 450, such as RTT measurements. Although shown in FIG. 4 as two different distances, particularly the distance 406 and the distance 462, the two distances may have the same value and, in some implementations, may be determined by a single device. For example, the UE 115 may determine the distance 406 and provide the distance 406 to the network entity 450 for storage at the network entity 450 as the distance 462, or the network entity 450 may determine the distance 462 and provide the distance 462 to the UE 115 for storage as the distance 406. Alternatively, the UE 115 may determine the distance 406 and the network entity 450 may determine the distance 462. The threshold information 408 indicates one or more thresholds used to perform operations by the UE 115 and the network entity 450, as described above. The beam group information 414 indicates a plurality of beam groups, as described above.

The transmitter 456 is configured to transmit reference signals, synchronization signals, control information and data to one or more other devices, and the receiver 458 is configured to receive reference signals, control information and data from one or more other devices. For example, the transmitter 456 may transmit signaling, control information and data to, and the receiver 458 may receive signaling, control information and data from, the UE 115. In some implementations, the transmitter 456 and the receiver 458 may be integrated in one or more transceivers. Additionally or alternatively, the transmitter 456 or the receiver 458 may include or correspond to one or more components of base station 105 described with reference to FIG. 2.

The antenna array 459 may be coupled to the transmitter 456, the receiver 458, or a communication interface. The antenna array 459 may include multiple antenna elements configured to perform wireless communications with other devices, such as with the UE 115. In some implementations, the antenna array 459 may be configured to perform wireless communications using different beams. The beams may include TX beams and RX beams. To illustrate, the antenna array 459 may include multiple independent sets (or subsets) of antenna elements (or multiple individual antenna arrays), and each set of antenna elements of the antenna array 459 may be configured to communicate using a different respective beam that may have a different respective direction than the other beams. For example, a first set of antenna elements of the antenna array 459 may be configured to communicate via a first beam having a first direction, and a second set of antenna elements of the antenna array 459 may be configured to communicate via a second beam having a second direction. In other implementations, the antenna array 459 may be configured to communicate via more than two beams. Alternatively, one or more sets of antenna elements of the antenna array 459 may be configured to concurrently generate multiple beams, for example using multiple RF chains of the network entity 450. Each individual set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array 459 may include or correspond to multiple antenna panels, and each antenna panel may be configured to communicate using a different respective beam.

In some implementations, the wireless communications system 400 implements a 5G NR network. For example, the wireless communications system 400 may include multiple 5G-capable UEs 115 and multiple 5G-capable network entities 450, such as UEs and base stations (or other network entities) configured to operate in accordance with a 5G NR network protocol such as that defined by the 3GPP. In some other implementations, the wireless communications system 400 implements a 6G network.

During operation of the wireless communications system 400, the UE 115 may select a candidate communication beam from a plurality of candidate communication beams for communication with the network entity 450, and the UE 115 may transmit a beam group indicator 470 to the network entity 450. The beam group indicator 470 may indicate a first beam group of a plurality of beam groups that collectively include a plurality of candidate communication beams. Each beam group of the plurality of beam groups includes one or more respective candidate communication beams of the plurality of candidate communication beams. For example, the plurality of candidate communication beams may include TX beams, RX beams, or a combination thereof usable by the UE 115 and the network entity 450 using one or more configurations of the antenna array 424 and the antenna array 459, respectively. In some implementations, at least some of the plurality of candidate communication beams may be associated with different beam weights, such as beam weights designed for communications in a far field range and beam weights designed for communications in a near field range, as further described herein. The mapping of the plurality of candidate communication beams to the plurality of beam groups may be indicated by the beam group information 414, which may result from a negotiation process between the UE 115 and the network entity 450 to assign the plurality of candidate communication beams to the plurality of beam groups, such as performed during an association process, as further described herein. Additionally, the threshold information 408 may indicate one or more thresholds with respect to distances from the network entity 450, specifically the antenna array 459, and the threshold information 408 may be shared by the network entity 450 with the UE 115 during the association process, as further described herein.

The UE 115 may select the candidate communication beam based on the beam measurements 416. To illustrate, the UE 115 may perform one or more beam sweeping operations associated with the plurality of candidate communication beams, and measurements resulting from the beam sweeping operations may be stored as the beam measurements 416. The beam measurements 416 may represent signal strength measurements, interference measurements, power measurements, other beam or signal measurements, or a combination thereof. After the beam sweeping operations are complete, the UE 115 may select a beam from the plurality of candidate communication beams in association with one or more criteria and the beam measurements 416. For example, the UE 115 may select a beam associated with a largest measurement value, a beam associated with one or more measurements that satisfy a threshold, a beam that is first in an ordered ranking of the plurality of candidate communication beams based on the beam measurements 416, or by other criteria used by wireless communication devices to select communication beams. As used herein, performing an action in association with another action or condition, such as selecting the beam in association with one or more criteria and the beam measurements 416, may refer to performance of the action due to a relationship between the action and the other action or condition, such as based on the other action or the existence of the condition, responsive to (or in response to) performance of the other action or the existence of the condition, due to the existence of a correspondence, association, or relationship between the action and the other action or condition, or the like. For example, the UE 115 may select the beam in association with the one or more criteria and the beam measurements 416 by selecting a beam that satisfies the one or more criteria with respect to associated values of the beam measurements 416.

After selecting the beam, the UE 115 may select a beam group of the plurality of beam groups that includes the selected beam. As an illustrative example, a first beam group may include three candidate communication beams, a second beam group may include three other candidate communication beams, and a third beam group may include three other candidate communication beams. In this example, if the selected beam is one of the three candidate communication beams in the first beam group, the UE 115 may generate the beam group indicator 470 that is associated with or indicates the first beam group in association with the first beam being in the first beam group In some implementations, the beam group indicator 470 includes a transmission configuration indicator (TCI) group indicator or a quasi co-location (QCL) group indicator. For example, during a negotiation process described in further detail below, each beam group of the plurality of beam groups may be associated with a respective TCI group identifier or QCL group identifier that can be indicated by the beam group indicator 470. The selected beam group may include candidate communication beams usable by the UE 115 (referred to herein as UE beams) and the network entity 450 (referred to herein as network beams) to perform communication between the UE 115 and the network entity 450. After sending the beam group indicator 470, the UE 115 may perform communications with the network entity 450 via only the candidate communication beams included in the selected beam group, at least until another beam group is selected. Similarly, the network entity 450 may perform communications with the UE 115 via only the candidate communication beams included in the selected beam group indicated by the beam group indicator 470.

At a first time, the UE 115 may move to, or be located at, a first position where the distance 406 between the UE 115 and the network entity 450 (as determined by the UE 115) is greater than the first threshold 410. The first threshold 410 may be a minimum distance at which communication performance using the antenna array 459 is expected to be dominated by far field behavior, and at distances that are less than the first threshold 410 the communication performance is expected to be dominated by near field behavior. For example, the first threshold 410 may be a Fraunhofer distance of the antenna array 459 associated with a particular communication frequency and a particular antenna array configuration, and this Fraunhofer distance may capture the distinctive behavior between near and far fields. Alternatively, the first threshold 410 may represent a distance between which one communication beam or beam weights, also referred to as a codebook, has been determined to be less effective for communicating than a different communication beam or different beam weights, and the threshold information 408 may indicate multiple different thresholds representing distances at which it has been observed that a switching to a different communication beam or codebook of beam weights results in improved communication performance, increased signal energy, or both. The UE 115 may communicate with the network entity 450 via a first UE beam of the selected beam group in association with the distance 406 between the UE 115 and the network entity 450 being greater than the first threshold 410. Similarly, the network entity 450 may communicate with the UE 115 via a first network beam of the selected beam group in association with the distance 462 between the UE 115 and the network entity 450 being greater than the first threshold 410. As an example, the UE 115 and the network entity 450 may perform first communications 472 via the respective first beams at the UE 115 and the network entity 450. The first communications 472 may include receiving or transmitting signals or data by the UE 115, receiving or transmitting signals or data by the network entity 450, or a combination thereof.

The UE 115 may move throughout a region, such as a serving cell, served by the network entity 450. At a second time, the UE 115 may move to, or be located at, a second position where distance between the UE 115 and the network entity 450 is less than the first threshold 410. The UE 115 may perform a beam switching operation to switch to a second beam of the first beam group in association with the distance 406 being less than the first threshold 410, or in implementations in which the threshold information 408 includes multiple thresholds, in association with the distance 406 being between the first threshold 410 and the second threshold 412. Similarly, the network entity 450 may perform a beam switching operation to switch to a second beam of the first beam group in association with the distance 462 being less than the first threshold 410 (or between the first threshold 410 and the second threshold 412). As a result of the beam switching operations, the UE 115 may communicate with the network entity 450 via a second UE beam of the selected beam group and the network entity 450 may communicate with the UE 115 via a second network beam of the selected beam group. As an example, the UE 115 and the network entity 450 may perform second communications 474 via the respective second beams at the UE 115 and the network entity 450. The second communications 474 may include receiving or transmitting signals or data by the UE 115, receiving or transmitting signals or data by the network entity 450, or a combination thereof.

In some implementations, the respective first beams and second beams are associated with different directions, different beam shapes, different beam weights, other differences, or a combination thereof. In some particular implementations, such as if the first threshold 410 is the Fraunhofer distance, the respective first beams (of the first communications 472) are associated with beam weights for communications in a far field range and the respective second beams (of the second communication 474) are associated with beam weights for communications in a near field range. For example, the beam weights associated with the first beams may be designed or selected to steer energy of communications in a channel between the UE 115 and the network entity 450, such as to a dominant cluster in the channel. It is noted that a cluster at frequencies in the millimeter wave band and beyond typically corresponds to a reflecting object, such as a metallic object including a vehicle, glass, a building, or the like, or a smooth surface. In this example, the beam weights associated with the second beams may be designed or tailored to increase or maximize an approximate available energy in the communication beam from the network entity 450 to the UE 115. As used herein, beam weights are designed, selected, or tailored for a purpose by selection of appropriate beam weights to achieve the desired goal, and the selected beam weights may be aggregated or stored in groups (a group is typically called an analog beamforming codebook), such as a far field codebook and a near field codebook, as non-limiting examples. Additionally or alternatively, a far field range may refer to distances that are greater than a Fraunhofer distance associated with a respective antenna, and a near field range may refer to distances that are less than or equal to the Fraunhofer distance the respective antenna. Because the respective second beams are associated with increasing available signal energy in communications from the network entity 450 to UEs at distances less than the first threshold, performance of the beam switching operations and the resultant change from the first communications 472 to the second communications 474 may increase the available energy in the second communications 474 when the UE 115 is at the second position, as compared to performing the first communications 472 at the second position. As such, an amount of energy harvested by performance of energy harvesting at the UE 115 may be increased by the above-described distance-based beam switching.

In some implementations, during an association process between the UE 115 and the network entity 450, the network entity 450 shares the threshold information 408. For example, the network entity 450 may transmit, in association with an association process with the UE 115, the threshold information 408. The UE 115 may receive and store the threshold information 408 during the association process. The threshold information 408 may be preprogrammed or prestored at the network entity 450 and may be based on one or more parameters of the antenna array 459. In some implementations, the threshold information 408 is also based on the communication frequencies by which the antenna array 459 is to perform wireless communications. Alternatively, the network entity 450 may determine the threshold information 408 in association with one or more parameters of the antenna array 459, and optionally a frequency for communications to be performed. Although described as being shared during the association process, in some other implementations, the threshold information 408 may be broadcast by the network entity 450, such as via periodic cell information broadcasts, or the threshold information 408 may be preprogrammed or prestored at the UE 115.

In some implementations, the UE 115 and network entity 450 may negotiate, in association with the association process between the UE 115 and the network entity 450, assignments of the plurality of candidate communication beams to the plurality of beam groups. The assignment of the candidate communication beams may be performed in association with the group of thresholds. For example, the UE 115 and the network entity 450 may identify multiple candidate communication beams that correspond to similar expected performance in a particular direction, orientation, or the like, but at different distances between the UE 115 and the network entity 450, particularly distances represented by the threshold information 408. The identified beams may be assigned to a same beam group by the UE 115 and the network entity 450. Similar identification and assignment of other related candidate communication beams to other beam groups may be performed through the negotiation process. For example, the UE 115 may provide an indication of a first proposed beam group to the network entity 450, and the network entity 450 may accept the proposed grouping or respond with a modified first proposed beam group, which the UE 115 may accept or the above-described operations may be repeated until agreement is reached for the first beam group. Similar operations may be performed until all candidate communication beams are assigned to a respective beam group that is accepted by both the UE 115 and the network entity 450, and this mapping of candidate communication beams to beam groups is stored at the UE 115 and the network entity 450 as the beam group information 414. Although described above as the UE 115 providing the first proposal for a beam group, in other implementations, the network entity 450 may offer the first proposal, and the UE 115 may accept or provide a modified proposal. In other implementations, the beam group information 414 may be determined by a single device and shared with the other device. For example, the network entity 450 may determine the beam group information 414 and transmit the beam group information 414 to the UE 115. Alternatively, the UE 115 may determine the beam group information 414 and transmit the beam group information 414 to the network entity 450. In some implementations, each beam group of the plurality of beam groups represented by the beam group information 414 includes at least one respective beam associated with beam weights tailored for communications in a far field range and at least one respective beam associated with beam weights tailored for communications in a near field range. In such implementations, at least one communication beam may be generated based on beam weights from a near field codebook, thereby increasing the available energy that can be harvested from the communication beam as compared to a communication beam generated based on a far field codebook when distance between the UE 115 and the network entity 450 is less than the Fraunhofer distance.

In implementations in which the threshold information 408 includes multiple thresholds, the UE 115 and the network entity 450 may perform additional beam switching. As an example, at a third time the UE 115 may move to a third position that is closer to the network entity 450 than the second position. The UE 115 may perform, in association with the distance 406 being less than the second threshold, a second beam switching operation to switch communication beams at the antenna array 424. Similarly, the network entity 450 may perform, in association with the distance 462 being less than the second threshold, a second beam switching operation to switch communication beams at the antenna array 459. As a result of the respective second beam switching operations, the UE 115 may communicate with the network entity 450 via a third UE beam of the selected beam group and the network entity 450 may communicate with the UE 115 via a third network beam of the selected beam group. As an example, the UE 115 and the network entity 450 may perform additional communications 478 via the respective third beams at the UE 115 and the network entity 450. The additional communications 478 may include receiving or transmitting signals or data by the UE 115, receiving or transmitting signals or data by the network entity 450, or a combination thereof. In some such examples, the first UE beam, the first network beam, the second UE beam, and the second network beam are associated with beam weights designed for communications in a far field range (such as, using a far field codebook) and the third UE beam and the third network beam are associated with beam weights designed for communications in a near field range (such as, using a near field codebook).

As another example of an implementation in which the threshold information 408 includes multiple thresholds, the UE 115 and the network entity 450 may perform additional beam switching in association with a change in the operating mode of the UE 115. To illustrate, the UE 115 may transition from a standard operating mode (also referred to as an active operating mode or a communications mode) to an energy harvesting mode in which the UE 115 is configured to harvest energy from communications by the network entity 450 for recharging a battery or other rechargeable energy source. The UE 115 may transition to the energy harvesting mode if an available energy at the UE 115 falling below a threshold, if an application requests the transition, if a large amount of data is scheduled for transmission at a later time and the available energy does not exceed an estimated energy use, if a user command requesting energy harvesting is received, or if another trigger condition occurs. In association with transitioning to the energy harvesting mode, the UE 115 may transmit an operating mode indicator 476 to the network entity 450. The operating mode indicator 476 may indicate an operating mode at the UE 115, such as the energy harvesting mode, and the network entity 450 may determine the operating mode of the UE 115 as the indicated operating mode. Alternatively, the operating mode indicator 476 may indicate that a transition between operating modes has occurred at the UE 115, and the network entity 450 may infer from the operating mode indicator 476 that the UE 115 has transitioned to the energy harvesting mode. The operating mode indicator 476 may include or correspond to a TCI state change indicator, a QCL group change indicator, or another type of indicator. The UE 115 may perform a third beam switching operation to switch the communication beam at the antenna array 424 in association with transmission of the operating mode indicator 476. Similarly, the network entity 450 may perform a third beam switching operation to switch the communication beam at the antenna array 459 in association with receipt of the operating mode indicator 476. To illustrate, the UE 115 may perform the third beam switching operation to switch from the second UE beam to the third UE beam, the network entity 450 may perform the third beam switching operation to switch from the second network beam to the third network beam, and the UE 115 and the network entity 450 may perform the additional communications 478 using the respective third beams. In some such examples, the first UE beam, the second UE beam, the first network beam, and the second network beam are associated with beam weights designed or tailored for communications in the far field range, and the third UE beam and the third network beam are associated with beam weights designed or tailored for communications the near field range. Alternatively, the first UE beam, the second UE beam, the first network beam, and the second network beam are associated with beam weights designed or tailored for communication performance, and the third UE beam and the third network beam are associated with beam weights designed or tailored for energy harvesting performance. In this manner, the beam switching and transition from performing the second communications 474 to performing the additional communications 478 may be performed when the UE 115 transitions to the energy harvesting mode instead of based on the distance 406 and the distance 462. Although the above described example is in the context of switching between the second communications 474 and the additional communications 478, in other examples, the switch between the first communications 472 and the second communications 474 (and the associated beam switching) may be performed in association with the UE 115 transitioning to the energy harvesting mode.

As described with reference to FIG. 4, the present disclosure provides techniques for supporting distance-based or energy harvesting mode-based beam switching. The techniques described may realize improved energy harvesting at the UE 115 when the UE 115 is within the near field with respect to the antenna array 459 of the network entity 450. For example, when the distance 406 and the distance 462 falls below the first threshold 410 (or one or more of the thresholds indicated by the threshold information 408), the UE 115 and the network entity 450 may perform beam switching to switch from performing the first communications 472 via respective first communication beams that are designed for communication performance in a far field range to performing the second communications 474 via respective second communication beams that are designed for energy harvesting performance in a near field range. The selection of the respective first and second beams is performed in association with a selected beam group indicated by the UE transmitting the beam group indicator 470. By performing the beam switching operations when the UE 115 moves closer to the network entity 450, the UE 115 and the network entity 450 may perform the second communications 474 with increased available energy as compared to the first communication 472 that enables improved energy harvesting at the UE 115.

Figure 5:
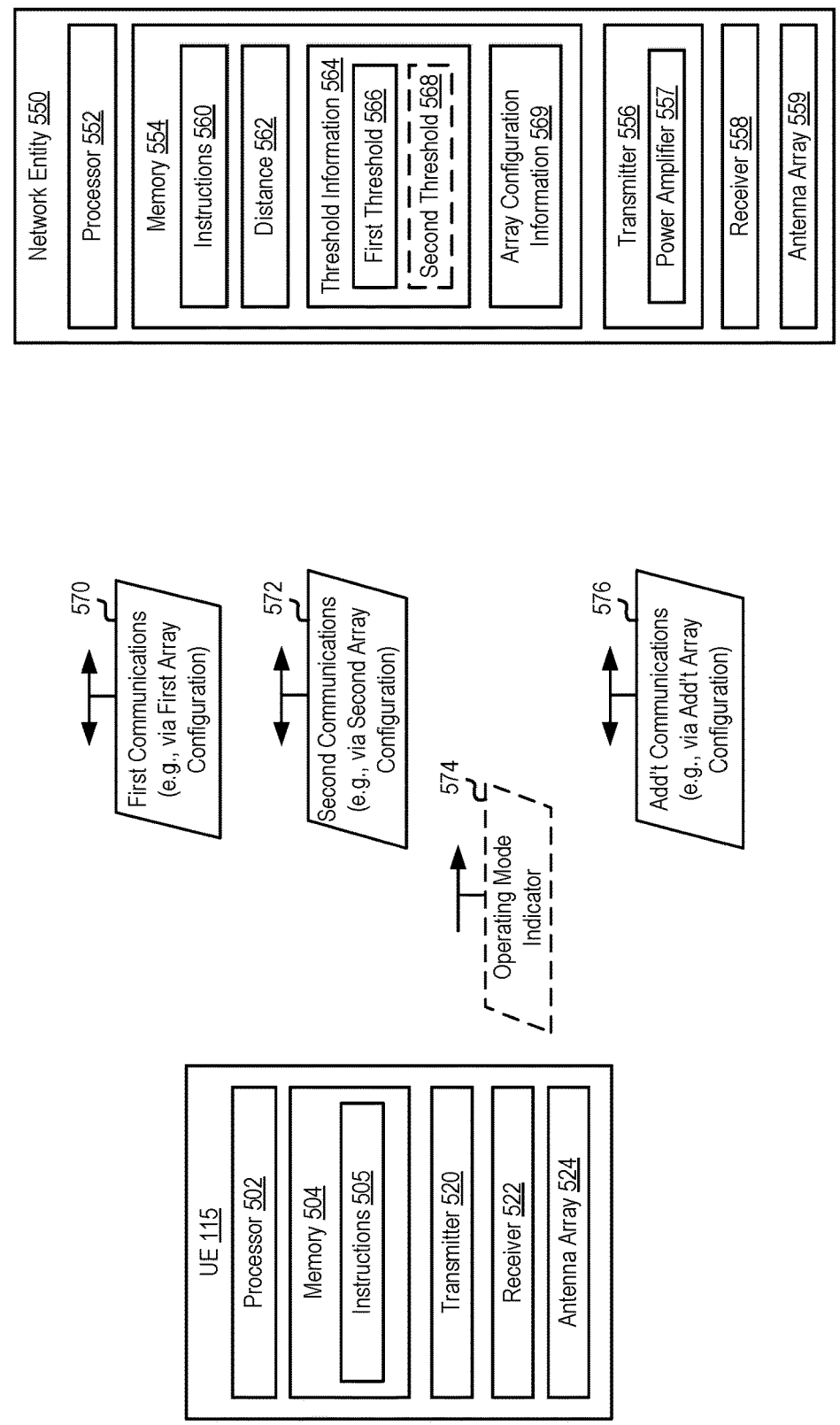
FIG. 5 is a block diagram illustrating another example wireless communication system that supports improved near field communications, particularly via changing antenna array configurations, according to one or more aspects.

FIG. 5 is a block diagram of another example wireless communications system 500 that supports improved near field communications, particularly via changing antenna array configurations, according to one or more aspects of the present disclosure. In some examples, the wireless communications system 500 may implement aspects of the wireless network 100. The wireless communications system 500 includes the UE 115 and a network entity 550, such as a base station. Although one UE 115 and one network entity 550 are illustrated, in some other implementations, the wireless communications system 500 may generally include multiple UEs 115, multiple network entities 550.

The UE 115 can include a variety of components (such as structural, hardware components) used for carrying out one or more functions described herein. For example, these components can include one or more processors 502 (hereinafter referred to collectively as "the processor 502"), one or more memory devices 504 (hereinafter referred to collectively as "the memory 504"), one or more transmitters 520 (hereinafter referred to collectively as "the transmitter 520"), one or more receivers 522 (hereinafter referred to collectively as "the receiver 522"), and one or more antenna arrays 524 (hereinafter referred to collectively as "the antenna array 524"). The processor 502 may be configured to execute instructions 505 stored in the memory 504 to perform the operations described herein. In some implementations, the processor 502 includes or corresponds to one or more of the receive processor 258, the transmit processor 264, and the controller 280 of FIG. 2, and the memory 504 includes or corresponds to the memory 282 of FIG. 2.

The transmitter 520 is configured to transmit reference signals, control information and data to one or more other devices, and the receiver 522 is configured to receive references signals, synchronization signals, control information and data from one or more other devices. For example, the transmitter 520 may transmit signaling, control information and data to, and the receiver 522 may receive signaling, control information and data from, the network entity 550. In some implementations, the transmitter 520 and the receiver 522 may be integrated in one or more transceivers. Additionally or alternatively, the transmitter 520 or the receiver 522 may include or correspond to one or more components of the UE 115 described with reference to FIG. 2.

The antenna array 524 may be coupled to the transmitter 520, the receiver 522, or a communication interface. The antenna array 524 may include multiple antenna elements configured to perform wireless communications with other devices, such as with the network entity 550. In some implementations, the antenna array 524 may be configured to perform wireless communications using different beams, also referred to as antenna beams. The beams may include TX beams and RX beams. To illustrate, the antenna array 524 may include multiple independent sets (or subsets) of antenna elements (or multiple individual antenna arrays), and each set of antenna elements of the antenna array 524 may be configured to communicate using a different respective beam that may have a different respective direction than the other beams. For example, a first set of antenna elements of the antenna array 524 may be configured to communicate via a first beam having a first direction, and a second set of antenna elements of the antenna array 524 may be configured to communicate via a second beam having a second direction. In other implementations, the antenna array 524 may be configured to communicate via more than two beams. Alternatively, one or more sets of antenna elements of the antenna array 524 may be configured to concurrently generate multiple beams, for example using multiple RF chains of the UE 115. Each individual set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array 524 may include or correspond to multiple antenna panels, and each antenna panel may be configured to communicate using a different respective beam.

The network entity 550 can include a variety of components (such as structural, hardware components) used for carrying out one or more functions described herein. For example, these components can include one or more processors 552 (hereinafter referred to collectively as "the processor 552"), one or more memory devices 554 (hereinafter referred to collectively as "the memory 554"), one or more transmitters 556 (hereinafter referred to collectively as "the transmitter 556"), one or more receivers 558 (hereinafter referred to collectively as "the receiver 558"), and one or more antenna arrays 559 (hereinafter referred to collectively as "the antenna array 559"). In some implementations, the network entity 550 may include or correspond to a base station, such as the base station 105 described with reference to FIGS. 1-3. The processor 552 may be configured to execute instructions 560 stored in the memory 554 to perform the operations described herein. In some implementations, the processor 552 includes or corresponds to one or more of the receive processor 238, the transmit processor 220, and the controller 240 of FIG. 2, and the memory 554 includes or corresponds to the memory 242 of FIG. 2.

The memory 554 includes or is configured to store the instructions 560, distance 562, threshold information 564, and array configuration information 569. The distance 562 represents a distance between the UE 115 and the network entity 550. The distance 562 may be determined by the network entity 550 based on positing information, such as GPS information or GLONASS information, or based on measurements performed by the network entity 550 in association with messaging between the UE 115 and the network entity 550, such as RTT measurements. The threshold information 564 indicates one or more thresholds used to perform operations by the network entity 550, such as one or more distance thresholds. In some implementations, the threshold information 564 indicates a first threshold 566 and a second threshold 568 that is less than the first threshold 566. Although two thresholds are shown in FIG. 5, in other examples, the threshold information 564 may indicate a single threshold or more than two thresholds. The array configuration information 569 indicates one or more configurations of the antenna array 559 that are each associated with a respective threshold indicated by the threshold information 564. For example, the array configuration information 569 may indicate a number of active or inactive antenna elements of the antenna array 559, a location or other configuration of the active (or inactive) antenna elements, beam weights associated with communication via the active antenna elements, other information for configuring the antenna array 559, or a combination thereof. In some implementations, the array configuration information 569 also indicates settings for one or more power amplifiers, such as a target output power or gain.

The transmitter 556 is configured to transmit reference signals, synchronization signals, control information and data to one or more other devices, and the receiver 558 is configured to receive reference signals, control information and data from one or more other devices. For example, the transmitter 556 may transmit signaling, control information and data to, and the receiver 558 may receive signaling, control information and data from, the UE 115. In some implementations, the transmitter 556 and the receiver 558 may be integrated in one or more transceivers. Additionally or alternatively, the transmitter 556 or the receiver 558 may include or correspond to one or more components of the base station 105 described with reference to FIG. 2. In some implementations, the transmitter 556 includes one or more power amplifiers 557 (hereinafter referred to collectively as "the power amplifier 557"). The power amplifier 557 may be configured to amplify the power of a signal generated by the network entity 550 prior to transmission of the signal.

The antenna array 559 may be coupled to the transmitter 556, the receiver 558, or a communication interface. The antenna array 559 may include multiple antenna elements configured to perform wireless communications with other devices, such as with the UE 115. In some implementations, the antenna array 559 may be configured to perform wireless communications using different beams, also referred to as antenna beams. The beams may include TX beams and RX beams. To illustrate, the antenna array 559 may include multiple independent sets (or subsets) of antenna elements (or multiple individual antenna arrays), and each set of antenna elements of the antenna array 559 may be configured to communicate using a different respective beam that may have a different respective direction than the other beams. For example, a first set of antenna elements of the antenna array 559 may be configured to communicate via a first beam having a first direction, and a second set of antenna elements of the antenna array 559 may be configured to communicate via a second beam having a second direction. In other implementations, the antenna array 559 may be configured to communicate via more than two beams. Alternatively, one or more sets of antenna elements of the antenna array 559 may be configured to concurrently generate multiple beams, for example using multiple RF chains of the network entity 550. Each individual set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array 559 may include or correspond to multiple antenna panels, and each antenna panel may be configured to communicate using a different respective beam.

In some implementations, the wireless communications system 500 implements a 5G NR network. For example, the wireless communications system 500 may include multiple 5G-capable UEs 115 and multiple 5G-capable network entities 550, such as UEs and base stations (or other network entities) configured to operate in accordance with a 5G NR network protocol such as that defined by the 3GPP. In some other implementations, the wireless communications system 500 implements a 6G network.

During operation of the wireless communications system 500, the UE 115 and the network entity 550 may select one or more antenna beams for use in performing wireless communications, such as based on beam measurements, based on negotiated beams, or the like. At a first time, the UE 115 may move to, or be located at, a first position where the distance 562 between the UE 115 and the network entity 450 (as determined by the network entity 550) is greater than the first threshold 566. The first threshold 566 may be a minimum distance at which communication performance using a first configuration of the antenna array 559 is expected to be dominated by far field behavior, and at distances that are less than the first threshold 566 the communication performance using the first configuration is expected to be dominated by near field behavior. For example, the first threshold 566 may be a Fraunhofer distance of the antenna array 559 having a first antenna array configuration. Alternatively, the first threshold 566 may represent a distance between which communications via the antenna array 559 in the first configuration have been determined to be less effective communications via the antenna array 559 in other configurations, and the threshold information 564 may indicate multiple different thresholds representing distances at which it has been observed that a switching to a different antenna configuration for the antenna array 559 results in improved communication performance, increased signal energy, or both. The first configuration of the antenna array 559 may include or correspond to a configuration of active antenna elements, parameters associated with the antenna elements, other settings, or a combination thereof, as represented by the array configuration information 569. The network entity 550 may communicate with the UE 115 with the antenna array 559 in the first configuration in association with the distance 562 between the UE 115 and the network entity 550 being greater than the first threshold 566. As an example, the UE 115 and the network entity 550 may perform first communications 570 via respective communication beams at the UE 115 and the network entity 550. The first communications 570 may include receiving or transmitting signals or data by the UE 115, receiving or transmitting signals or data by the network entity 550, or a combination thereof.

The UE 115 may move throughout a region, such as a serving cell, served by the network entity 550. At a second time, the UE 115 may move to, or be located at, a second position where the distance 562 is less than the first threshold 566. The network entity 550 may configure the antenna array 559 to have a second configuration in association with the distance 562 being less than the first threshold 566, or in implementations in which the threshold information 564 includes multiple thresholds, in association with the distance 562 being between the first threshold 566 and the second threshold 568. For example, the network entity 550 may change an active state of one or more antenna elements of the antenna array 559, change one or more parameters of antenna elements of the antenna array 559, or the like, by modifying the array configuration information 569, such that the second configuration corresponds to an array size that is less than an array size that corresponds to the first configuration. As an example, the network entity 550 may configure the antenna array 559 to have the second configuration by deactivating one or more active antenna elements of the antenna array 559. As a result of configuring the antenna array 559 to have the second configuration, the network entity 550 may communicate with the UE 115 using the antenna array 559 in the second configuration. As an example, the UE 115 and the network entity 550 may perform second communications 572 via respective communication beams at the UE 115 and the network entity 550. The second communications 572 may include receiving or transmitting signals or data by the UE 115, receiving or transmitting signals or data by the network entity 550, or a combination thereof. Because the communications via the antenna array 559 in the second configuration are associated with increased available signal energy at distances less than the first threshold 566, performance of the configuration operations and the resultant change from the first communications 570 to the second communications 572 may increase the available energy in the second communications 572 when the UE 115 is at the second position, as compared to performing the first communications 570 at the second position. As such, an amount of energy harvested by performance of energy harvesting at the UE 115 may be increased by the above-described distance-based antenna configuring.

In some implementations, in addition to configuring the antenna array 559 in association with the distance 562 being less than the first threshold 566, the network entity 550 may also change a power of the power amplifier 557. To illustrate, the network entity 550 may set a gain associated with power amplifier 557 to a first gain to perform the first communications 570 in association with the distance 562 at the first time being greater than the first threshold 566. At the second time, when the distance 562 is less than the first threshold 566, the network entity 550 may increase the gain of the power amplifier 557 from the first gain to a second gain in association with the distance 562 being les than the first threshold 566 (or within the range between the first threshold 566 and the second threshold 568). The second gain is greater than the first gain, thereby causing the power of the signal transmitted by the network entity 550 to increase at the second time (when the distance 562 is less), as compared to the first time (when the distance 562 is greater). In some implementations, the array configuration information 569 may further indicate the settings or configurations of the power amplifier 557. In some implementations, the antenna array configurations and the power amplifier power settings may be designed such that a spectral efficiency realized with the antenna array 559 associated with the first array configuration (array size) and the power amplifier 557 associated with the first gain is approximately equal to a spectral efficiency realized with the antenna array 559 associated with the second array configuration (array size) and the power amplifier 557 associated with the second gain.

In some implementations, during an association process between the UE 115 and the network entity 550, the network entity 550 shares the threshold information 564. For example, the network entity 550 may transmit, in association with an association process with the UE 115, the threshold information 564. The UE 115 may receive and store the threshold information 564 during the association process. The threshold information 564 may be preprogrammed or prestored at the network entity 550 and may be based on one or more parameters of the antenna array 559. In some implementations, the threshold information 564 is also based on the communication frequencies by which the antenna array 559 is to perform wireless communications. Alternatively, the network entity 550 may determine the threshold information 564 in association with one or more parameters of the antenna array 559, and optionally a frequency for communications to be performed. Although described as being shared during the association process, in some other implementations, the threshold information 564 may be broadcast by the network entity 550, such as via periodic cell information broadcasts, or the threshold information 564 may be preprogrammed or prestored at the UE 115.

In implementations in which the threshold information 564 includes multiple thresholds, the network entity 550 may perform additional antenna array configuration and power amplifier configuring. As an example, at a third time the UE 115 may move to a third position that is closer to the network entity 550 than the second position. The network entity 550 may configure, in association with the distance 562 being less than the second threshold, the antenna array 559 to have a third array configuration, as indicated by modifying the array configuration information 569. The third array configuration may be associated with a third array size that is smaller than the second array size associated with the second antenna array configuration. In some implementations, the network entity 550 may also increase the gain of the power amplifier 557 from the second gain to a third gain that is greater than the second gain. As a result of the antenna array and power amplifier configuration operations, the network entity 550 and the UE 115 may perform additional communications 576 via the respective communication beams at the UE 115 and the network entity 550. The additional communications 576 may include receiving or transmitting signals or data by the UE 115, receiving or transmitting signals or data by the network entity 550, or a combination thereof. In some such examples, the first antenna array configuration, the first gain, the second antenna array configuration, and the second gain are designed for communications in a far field range and the third antenna array configuration and the third gain are designed for communications in a near field range. Alternatively, if the UE 115 returns to the first position (or another position that is more than the first threshold distance from the network entity 550) at the third time, the network entity 550 may configure, in association with the distance 562 being greater than the first threshold, the antenna array 559 to have the first array configuration, as indicated by modifying the array configuration information 569. In some implementations, the network entity 550 may also decrease the gain of the power amplifier 557 from the second gain to the first gain. As a result of these antenna array and power amplifier configuration operations, the network entity 550 and the UE 115 may perform the additional communications 576 via the respective communication beams at the UE 115 and the network entity 550 with the antenna array 559 having a larger antenna size (number of active antenna elements) and the power amplifier 557 having a decreased gain at the third time.

In some implementations, the network entity 550 may perform additional antenna array and power amplifier configuring in association with a change in the operating mode of the UE 115. To illustrate, the UE 115 may transition from a standard operating mode (also referred to as an active operating mode or a communications mode) to an energy harvesting mode in which the UE 115 is configured to harvest energy from communications by the network entity 550 for recharging a battery or other rechargeable energy source. The UE 115 may transition to the energy harvesting mode if an available energy at the UE 115 falling below a threshold, if an application requests the transition, if a large amount of data is scheduled for transmission at a later time and the available energy does not exceed an estimated energy use, if a user command requesting energy harvesting is received, or if another trigger condition occurs. In association with transitioning to the energy harvesting mode, the UE 115 may transmit an operating mode indicator 574 to the network entity 550. The operating mode indicator 574 may indicate an operating mode at the UE 115, such as the energy harvesting mode, and the network entity 550 may determine the operating mode of the UE 115 as the indicated operating mode. Alternatively, the operating mode indicator 574 may indicate that a transition between operating modes has occurred at the UE 115, and the network entity 550 may infer from the operating mode indicator 574 that the UE 115 has transitioned to the energy harvesting mode. The operating mode indicator 574 may include or correspond to a TCI state change indicator, a QCL group change indicator, or another type of indicator. The network entity 550 may change a configuration of the antenna array 559 and a gain of the power amplifier 557 in association with receipt of the operating mode indicator 574. To illustrate, the network entity 550 may cause the antenna array 559 to have the third antenna configuration and cause the power amplifier to have the third power setting, and the UE 115 and the network entity 550 may perform the additional communications 576 using respective communication beams, as described above. In some such examples, the first antenna array configuration, the first gain, the second antenna array configuration, and the second gain are designed or tailored for communication performance, and the third antenna array configuration and the third gain are designed or tailored for energy harvesting performance. In this manner, the antenna array and power amplifier configuring and transition from performing the second communications 572 to performing the additional communications 576 may be performed when the UE 115 transitions to the energy harvesting mode instead of based on the distance 562. Although the above described example is in the context of switching between the second communications 572 and the additional communications 576, in other examples, the switch between the first communications 570 and the second communications 572 (and the associated antenna array and power amplifier configuring) may be performed in association with the UE 115 transitioning to the energy harvesting mode.

As described with reference to FIG. 5, various aspects of the present disclosure support improved near field communications, particular via antenna array configuring. The techniques described may realize improved energy harvesting at the UE 115 when the UE 115 is within the near field with respect to the antenna array 559 of the network entity 550. For example, when the distance 562 falls below the first threshold 566 (or one or more of the thresholds indicated by the threshold information 564), the network entity 550 may change a configuration of the antenna array 559 from a first configuration associated with a first antenna array size to a second configuration associated with a second antenna array size that is smaller than the first antenna array size, and the network entity 550 may also change the gain of the power amplifier 557 from a first gain to a second gain that is greater than the first gain. These configuration changes may result in transitioning from performing the first communications 570 to performing the second communications 572. By performing the antenna array configuring and power amplifier configuring operations when the UE 115 moves closer to the network entity 550, the network entity 550 may perform the second communications 572 with increased available energy that enables improved energy harvesting at the UE 115, such as by approximately maintaining a TRP point across both communications.

Figure 6:
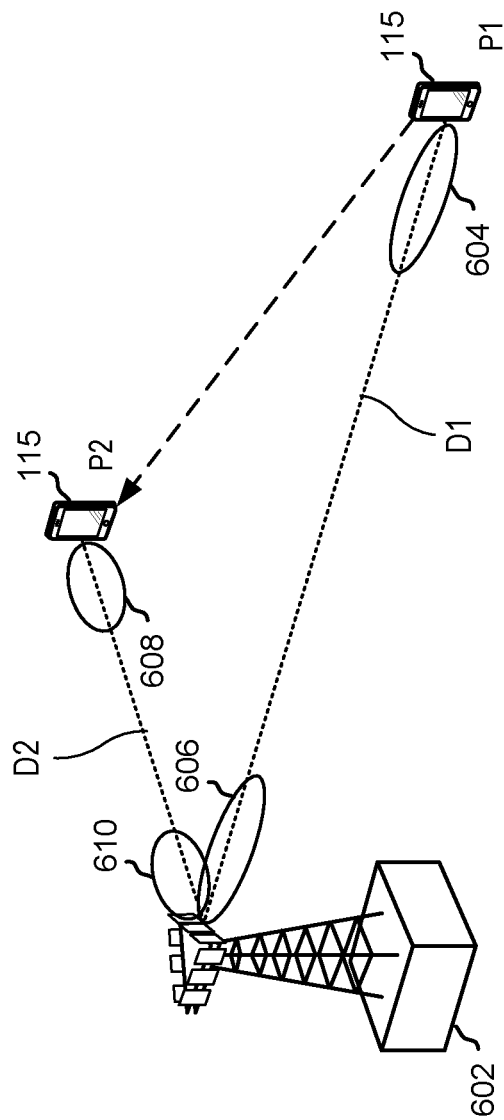
FIG. 6 is a diagram illustrating an example of beam switching operations performed by devices in a wireless communications system to support improved near field communications according to one or more aspects.

FIG. 6 is a diagram of an example of beam switching operations performed by devices in a wireless communications system 600 to support improved near field communications according to one or more aspects of the present disclosure. The wireless communications system 600 includes a network entity 602, such as a base station, and the UE 115. In some implementations, the network entity 602 includes or corresponds to the base station 105 of FIGS. 1-3 or the network entity 450 of FIG. 4.

During an association process between the UE 115 and the network entity 602, such as when the UE 115 joins a cell supported by the network entity 602, or via other signaling, the network entity 602 may share a set of thresholds with the UE 115. The set of thresholds may include distance thresholds that correspond to distances at which the near field or the far field are located with respect to an antenna array of the network entity 602, distances at which different communication beams are expected to be more effective for performing wireless communications, or the like. In some implementations, each of the thresholds may be associated with a respective communication bandwidth or frequency range. For example, one or more thresholds may be associated with 6 GHz communications, one or more thresholds may be associated with 30 GHz communications, one or more thresholds may be associated with FR1 communications, one or more thresholds may be associated with FR2 or millimeter wave communications, or the like. The set of thresholds may be preconfigured at the network entity 602 when the network entity 602 is put into service or when an antenna array is installed at the network entity 602, as non-limiting examples. Additionally, during the association process (or through other signaling), the network entity 602 and the UE 115 may negotiate assignments of a plurality of candidate communication beams to a plurality of beam groups. As an illustrative example, the UE 115 and the network entity 602 may negotiate to assign, for each of the respective devices, nine candidate communication beams to three beam groups according to the following assignment: group 1 includes a first candidate beam, a second candidate beam, and a third candidate beam, group 2 includes a fourth candidate beam, a fifth candidate beam, and a sixth candidate beam, and group 3 includes a seventh candidate beam, an eighth candidate beam, and a ninth candidate beam. In other examples, there may be fewer than nine or more than nine candidate communication beams or there may be fewer than three or more than three beam groups. The candidate communication beams may include TX beams, RX beams, or both TX beams and RX beams. The assignment may be based on beam measurements associated with the candidate beams, preconfigured beam information associated with the candidate beams, the set of thresholds, locations of the network entity 602 or the UE 115, orientations of the network entity 602 or the UE 115, presence of other devices within the cell supported by the network entity 602, locations of other network entities relative to the UE 115, other information, or a combination thereof. Each of the beam groups may be assigned to a certain identifier or indicator value, such as indicators associated with TCI state groups, QCL groups, or the like.

To communicate with the network entity 602, the UE 115 may perform one or more beam measurement operations to determine a preferred candidate communication beam for use in wireless communications. The preferred candidate communication beam may be associated with a particular signal strength, a particular interference level, or other criteria. After selecting the preferred candidate communication beam, the UE 115 may determine which beam group the preferred candidate communication beam is assigned to in order to communicate the beam group to the network entity 602. For example, if the UE 115 selects the first candidate communication beam as the preferred beam, because the first candidate communication beam is included in beam group 1, the UE 115 may transmit a beam group indicator that indicates beam group 1 to the network entity 602. The beam group indicator may include a TCI group indicator that is associated with beam group 1 or a QCL group indicator that is associated with beam group 1, as assigned during the negotiation process. By transmitting the beam group indicator associated with beam group 1, the UE 115 indicates that it will communicate with the network entity 602 using one or more of the candidate communication beams assigned to beam group 1.

At a first time t1, the UE 115 is located at a first position ("P1") that is a first distance ("D1") from the network entity 602. In the example shown in FIG. 6, the first distance D1 is sufficiently large such that the UE 115 is located in the far field with respect to the antenna array of the network entity 602. For example, the first distance D1 may be greater than the Fraunhofer distance associated with the antenna array of the network entity 602 for the communication band in which the UE 115 and the network entity 602 are communicating. As such, the first distance D1 may be greater than the first threshold of the set of thresholds, and the UE 115 may communicate with the network entity 602 via a first UE beam 604 at the first time (in association with the distance D1 being greater than the first threshold). Similarly, the network entity 602 may communicate with the UE 115 via a first network beam 606 at the first time (in association with the distance being greater than the first threshold). The first UE beam 604 and the first network beam 606 are the first candidate communication beam of beam group 1 in the beam groupings at each of the respective devices.

At a second time t2, the UE 115 may have traveled to a second position ("P2") that is a second distance ("D2") from the network entity 602. In the example shown in FIG. 6, the second distance D2 is less than the first threshold of the set of thresholds. Because the second distance D2 is less than the first threshold, the UE 115 may perform a beam switching operation in order to communicate with the network entity 602 via a second UE beam 608 at the second time. Similarly, the network entity 602 may perform a beam switching operation in order to communication with the UE 115 via a second network beam 610 at the second time. The second UE beam 608 and the second network beam 610 are the second candidate communication beam of beam group 1 in the beam groupings at each of the respective devices. Thus, when the distance between the UE 115 and the network entity 602 falls below the first threshold, the UE 115 and the network entity 602 may perform respective beam switching operations to switch among beams of beam group 1 to perform wireless communications with the other device. Additionally or alternatively, the beam switching operations may be performed in association with, such as responsive to, the UE 115 transitioning from a standard operating mode to an energy harvesting operating mode and transmitting an operating mode indicator, as described above with reference to FIG. 4.

In some examples, the respective first candidate communication beams and the second candidate communication beams may be different communication beams generated by different elements of the antenna arrays of the respective devices. For example, the first UE beam 604 may be associated with a first set of array elements of an antenna array of the UE 115, and the second UE beam 608 may be associated with a second set of array elements of the antenna array of the UE 115. Similarly, the first network beam 606 may be associated with a first set of array elements of the antenna array of the network entity 602, and the second network beam 610 may be associated with a second set of array elements of the antenna array of the network entity 602. In other examples, the respective first candidate communication beams and the second candidate communication beams may be generated using different sets of beam weights that are designed for communications at different distances. For example, the first UE beam 604 may be associated with beam weights that are designed for communications in a far field range, and the second UE beam 608 may be associated with beam weights that are designed for communications in a near field range. Similarly, the first network beam 606 may be associated with beam weights that are designed for communications in a far field range, and the second network beam 610 may be associated with beam weights that are designed for communications in a near field range. In some implementations, beam weights that are designed for communications in the far field range may be designed or tailored to steer energy toward a dominant cluster in a channel between the UE 115 and the network entity 602 using progressive phase shift (PPS) beams, discrete Fourier transform (DFT) beams, or constant phase offset (CPO) beams. These beam weights that are designed for communications in the far field range, also referred to as a far field codebook, may be designed or tailored, such as selected from candidate beam weights, to enable scanning of a target coverage area with a particular number of beams. In some implementations, beam weights that are designed for communications in the near field range may be chosen to maximize an approximate available energy in the communication beam from the network entity 602 to the UE 115 to enable a maximum possible energy harvesting yield by the UE 115. To illustrate, these beam weights may be selected to optimize Equation 1 below for selected regions $R_i$. This beam weight design, also referred to as a near field codebook, is distance-dependent but does not rely on H fields, and it is different than a far field codebook in the sense that an optimal $w_i$ does not steer energy along radial directions, because adjacent antenna elements' information does not project an angular relationship and can be more complicated.

Beam Weights for Near Field Codebook  Equation 1

$$w_i = \arg \max_{w:\|w\|=1} w^H \cdot \left( \int_{(x,y) \in R_i} (E_x(x,y)E_x(x,y)^H + E_y(x,y)E_y(x,y)^H + E_z(x,y)E_z(x,y)^H) dx dy \right) w$$

Performing the beam switching operations to communicate via the second UE beam 608 and the second network beam 610, instead of the first UE beam 604 and the first network beam 606, may enable improved energy harvesting at the UE 115. For example, switching from a beam associated with a size one codebook designed for communications in the far field range to a beam associated with a size one codebook designed for communications in the near field range may increase the energy available for energy harvesting by the UE 115 by approximately 5.9 dB for a single polarized antenna array or by approximately 7.63 dB for a dual polarized array. As another example, switching from a beam associated with a size four codebook designed for communications in the far field range to a beam associated with a size four codebook designed for communications in the near field range may increase the energy available for energy harvesting by the UE 115 by approximately 4.05 dB for a single polarized antenna array or by approximately 2.96 dB for a dual polarized array. As another example, switching from a beam associated with a size sixteen codebook designed for communications in the far field range to a beam associated with a size sixteen codebook designed for communications in the near field range may increase the energy available for energy harvesting by the UE 115 by approximately 3.63 dB for a single polarized antenna array or by approximately 3.3 dB for a dual polarized array.

In some implementations, the beam groups include more than two beams each, and the UE 115 and the network entity 602 may perform additional beam switching operations as the distance between the UE 115 and the network entity 602 changes. To illustrate, at a third time t3, the UE 115 may move to a third position P3 (not shown) that is a third distance D3 from the network entity 602. If the third distance D3 is less than a second threshold of the set of thresholds, such that the distance between the UE 115 and the network entity 602 is no longer in a range between the first threshold and the second threshold, the UE 115 may perform a beam switching operation to switch from the second UE beam 608 to a third UE beam, and similarly the network entity 602 may perform a beam switching operation to switch from the second network beam 610 to a third network beam. The respective third beams are also included in beam group 1 negotiated between the UE 115 and the network entity 602. In this example, the first UE beam 604, the first network beam 606, the second UE beam 608, and the second network beam 610 may be expected to have better performance for communications in the far field range, and the respective third beams may be expected to have better performance for communications in the near field range. Alternatively, if the UE 115 moves from the second position back to the first position, the UE 115 may perform a beam switching operation to switch from the second UE beam 608 to the first UE beam 604, and the network entity 602 may perform a beam switching operation to switch from the second network beam 610 to the first network beam 606. Thus, the UE 115 and the network entity 602 may perform distance-based beam switching operations in association with the set of thresholds to improve energy harvesting performance at the UE 115.

Figure 7:
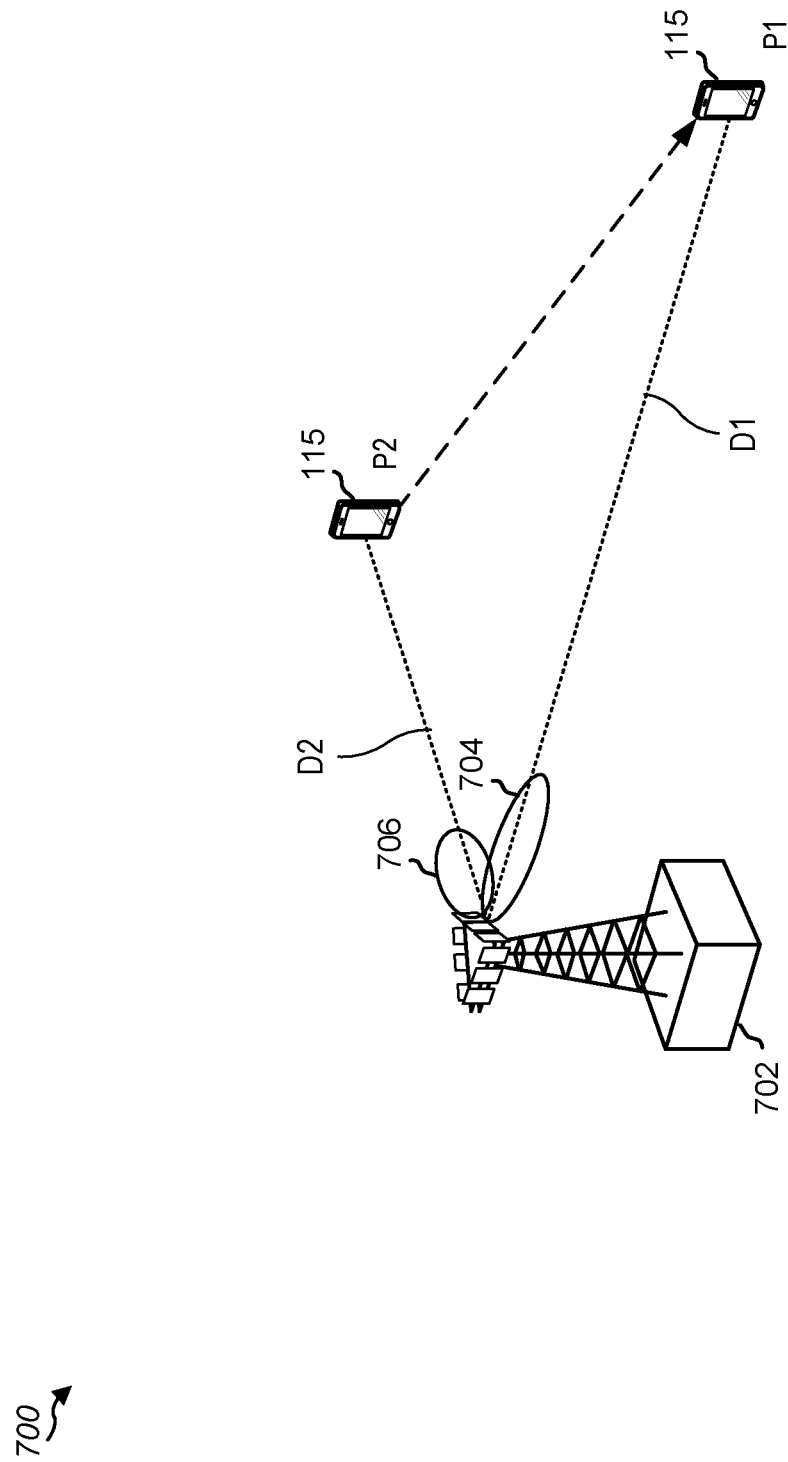
FIG. 7 is a diagram illustrating an example of antenna configuration and communications performed by devices in a wireless communications system to support improved near field communications according to one or more aspects.

FIG. 7 is a diagram of an example of antenna array configuration and communications performed by devices in a wireless communications system 700 to support improved near field communications according to one or more aspects of the present disclosure. The wireless communications system 700 includes a network entity 702, such as a base station, and the UE 115. In some implementations, the network entity 702 includes or corresponds to the base station 105 of FIGS. 1-3 or the network entity 550 of FIG. 5.

The network entity 702 may store a set of thresholds associated with an antenna array of the network entity 702. The set of thresholds may include distance thresholds that correspond to distances at which the near field or the far field are located with respect to the antenna array of the network entity 702, distances at which different antenna array configurations and power amplifier settings are expected to be more effective for performing wireless communications, or the like. In some implementations, each of the thresholds may be associated with a respective communication bandwidth or frequency range. For example, one or more thresholds may be associated with 6 GHz communications, one or more thresholds may be associated with 30 GHz communications, one or more thresholds may be associated with FR1 communications, one or more thresholds may be associated with FR2 or millimeter wave communications, or the like. The set of thresholds may be preconfigured at the network entity 702 when the network entity 702 is put into service or when an antenna array is installed at the network entity 702, as non-limiting examples.

At a first time t1, the UE 115 is located at a first position ("P1") that is a first distance ("D1") from the network entity 702. In the example shown in FIG. 7, the first distance D1 is sufficiently large such that the UE 115 is located in the far field with respect to the antenna array of the network entity 702. For example, the first distance D1 may be greater than the Fraunhofer distance associated with the antenna array of the network entity 702 for the communication band in which the UE 115 and the network entity 702 are communicating. As such, the first distance D1 may be greater than a first threshold of the set of thresholds, and the network entity 702 may communicate with the UE 115 via a first beam 704 at the first time (in association with the distance being less than the first threshold). The first beam 704 may be generated by the antenna array at the network entity 702 having a first configuration, such as a first configuration of active antenna elements. As an example, if the antenna array includes sixteen antenna elements, the first configuration may include all sixteen antenna elements being active. In some implementations, the first beam 704 may also be generated in association with a power amplifier connected to the antenna array having a first power setting, such as a first gain. For example, the power amplifier may be configured to have a first gain that is relatively low, as the activation of the sixteen antenna elements may provide sufficient energy for both communication and energy harvesting purposes.

At a second time t2, the UE 115 may have traveled to a second position ("P2") that is a second distance ("D2") from the network entity 702. In the example shown in FIG. 7, the second distance D2 is less than the first threshold of the set of thresholds. Because the second distance D2 is less than the first threshold, the network entity 702 may change a configuration of the antenna array from the first configuration to a second configuration, and the network entity 702 may communicate with the UE 115 via a second beam 706 that is generated by the antenna array having the second configuration. The second configuration may include fewer active antenna elements than the first configuration. For example, if the first configuration includes sixteen active antenna elements, the second configuration may include eight, four, two, or a single active antenna element. Because the Fraunhofer distance is based on the antenna configuration (the number of active antenna elements), changing to a configuration with fewer active antenna elements reduces the Fraunhofer distance. For example, the second distance D2 may be greater than the Fraunhofer distance for the antenna array having the second configuration. Thus, the UE 115 may remain in the far field with respect to the antenna array of the network entity 702, and as such not suffer degradation to the communications with the network entity 702 that would be experienced with communication beams or beam weights that are designed for communications in the far field range. In some implementations, in association with changing the configuration of the antenna array, the network entity 702 may change a setting of the power amplifier from the first setting to a second setting, such as a second gain, that is greater than the first setting (that increases the power of the signal output by the power amplifier). Increasing the gain of the signal transmitted by the antenna array having the second configuration (the reduced-dimensional array) may enable approximate maintenance of a transmission/reception point (TRP) spectrum efficiency, which enables the UE 115 to continue using a communication beam designed for communications in the far field range to communicate with the network entity 702 or to perform energy harvesting without significant performance degradation. Additionally or alternatively, the network entity 702 may change the configuration of the antenna array, and the gain of the power amplifier, based on receiving an operating mode indicator that indicates the UE 115 has transitioned from a standard operating mode to an energy harvesting mode.

In some implementations, the network entity 702 may perform additional antenna array configuring and power amplifier configuring operations as the distance between the UE 115 and the network entity 702 changes. To illustrate, at a third time t3, the UE 115 may move to a third position P3 (not shown) that is a third distance D3 from the network entity 702. If the third distance D3 is less than a second threshold of the set of thresholds, such that the distance between the UE 115 and the network entity 702 is no longer in a range between the first threshold and the second threshold, the network entity 702 may configure the antenna array to have a third configuration, and the network entity 702 may set the power amplifier to a third setting, such as a third gain. The third configuration may have fewer active antenna elements than the second configuration, and the third gain may be higher than the second gain. In this example, the first configuration and the first setting may be expected to have better performance for communications when the distance between the UE 115 and the network entity 702 is greater than the first threshold, the second configuration and the second setting may be expected to have better performance for communications when the distance between the UE 115 and the network entity 702 is between the first threshold and the second threshold, and the third configuration and the third setting may be expected to have better performance for communications when the distance between the UE 115 and the network entity 702 is less than the second threshold. Alternatively, if the UE 115 moves from the second position to the first position, the network entity 702 may change the antenna array configuration from the second configuration to the first configuration, and the gain associated with the power amplifier from the second gain to the first gain. Thus, the network entity 702 may perform distance-based changes to an antenna array configuration and a gain of a power in association with the set of thresholds to improve energy harvesting performance at the UE 115.

FIG. 8 is a flow diagram illustrating an example process 800 performable by a UE that supports improved near field communications, particularly via beam switching, according to one or more aspects of the present disclosure. The operations of the process 800 may be performed by a UE or its components as described herein. For example, the process 800 may be performed by the UE 115 described above with reference to FIGS. 1-7 or a UE described with reference to FIG. 9.

In block 802, the UE transmits, to a network entity, a beam group indicator. For example, the beam group indicator may include or correspond to the beam group indicator 470 of FIG. 4. The beam group indicator indicates a first beam group of a plurality of beam groups that collectively include a plurality of candidate communication beams. Each beam group of the plurality of beam groups includes one or more respective candidate communication beams of the plurality of candidate communication beams. For example, the plurality of beam groups may be indicated by the beam group information 414 of FIG. 4.

In block 804, the UE communicates, at a first time, with the network entity via a first beam of the one or more candidate communication beams of the first beam group in association with a distance between the UE and the network entity being greater than a first threshold of a set of one or more thresholds. For example, the communication via the first beam may include or correspond to the first communications 472 of FIG. 4, the distance may include or correspond to the distance 406 of FIG. 4, and the first threshold may include or correspond to the first threshold 410 of FIG. 4.

In block 806, the UE performs, at a second time in association with the distance being less than the first threshold, a beam switching operation associated with communicating with the network entity via a second beam of the one or more candidate communication beams of the first beam group. For example, the communicating via the second beam may include or correspond to the second communications 474 of FIG. 4.

In some implementations, the beam group indicator includes a TCI group indicator or a QCL group indicator. For example, the beam group indicator 470 of FIG. 4 may include or correspond to a TCI group indicator or a QCL group indicator. Additionally or alternatively, the first beam may be associated with beam weights for communications in a far field range and the second beam may be associated with beam weights for communications in a near field range. For example, the respective first beams associated with the first communications 472 of FIG. 4 may be associated with beam weights designed for communications in a far field range with respect to the antenna array 459, and the respective second beams associated with the second communications 474 of FIG. 4 may be associated with beam weights designed for communications in a near field range with respect to the antenna array 459.

In some implementations, the process 800 also includes performing, at a third time in association with the distance being less than a second threshold, of the one or more thresholds, that is smaller than the first threshold, a second beam switching operation associated with communicating with the network entity via a third beam of the one or more candidate communication beams of the first beam group. For example, the second beam switching operation may result in performance of the additional communications 478 of FIG. 4, which in some implementations are performed in association with the distance 406 and the distance 462 falling below the second threshold 412. In some such implementations, the first beam and the second beam are associated with beam weights for communications in a far field range and the third beam is associated with beam weights for communications in a near field range. For example, the first communications 472 and the second communications 474 may be performed with respective communication beams that are designed or tailored for communications in a far field range with respect to the antenna array 459, and the additional communications 478 may be performed with respective additional communication beams that are designed or tailored for communications in a near field range with respect to the antenna array 459.

In some implementations, the process 800 also includes performing one or more beam switching operations, selecting the first beam from the plurality of candidate communication beams in association with one or more criteria and measurements resulting from the one or more beam sweeping operations, and selecting the first beam group from the plurality of beam groups in association with the first beam being in the first beam group. For example, the measurements resulting from the one or more beam switching operations may include or correspond to the beam measurement 416 of FIG. 4. Additionally or alternatively, each beam group of the plurality of beam groups may include at least one respective beam associated with beam weights for communications in a far field range and at least one respective beam associated with beam weights for communications in a near field range. For example, each beam group indicated by the beam group information 414 of FIG. 4 may include at least one respective beam associated with beam weights for communications in a far field range with respect to the antenna array 459 and at least one respective beam associated with beam weights for communications in a near field range with respect to the antenna array 459.

In some implementations, the process 800 also includes receiving, in association with an association process with the network entity, information that indicates the set of one or more thresholds. For example, the UE 115 may receive the threshold information 408 of FIG. 4 from the network entity 450 during an association process between the UE 115 and the network entity 450. In some such implementations, the process 800 further includes negotiating, in association with the association process with the network entity, assignments of the plurality of candidate communication beams to the plurality of beam groups in association with the set of one or more thresholds. For example, the assignment of candidate communication beams to the plurality of beam groups represented by the beam group information 414 of FIG. 4 may be negotiated during an association process between the UE 115 and the network entity 450.

In some implementations, the process 800 may also include transmitting an operating mode indicator in association with a transition to an energy harvesting mode and performing, at a third time in association with transmission of the operating mode indicator, a second beam switching operation associated with communicating with the network entity via a third beam of the one or more candidate communication beams of the first beam group. The third beam is associated with beam weights for communications in a near field range. For example, in some implementations, the UE 115 and the network entity 450 may perform the additional communications 478 of FIG. 4 using respective additional beams that result from beam switching operations performed in association with transmission of the operating mode indicator 476. In some such implementations, the operating mode indicator includes a TCI state change indicator. For example, the operating mode indicator 476 of FIG. 4 may include or correspond to a TCI state change indicator.

FIG. 9 is a block diagram of an example UE 900 that supports improved near field communications, particularly via beam switching, according to one or more aspects of the present disclosure. The UE 900 may be configured to perform operations, including the blocks of the process 800 described with reference to FIG. 8. In some implementations, the UE 900 includes the structure, hardware, and components shown and described with reference to the UE 115 of FIGS. 1-7. For example, the UE 900 includes the controller 280, which operates to execute logic or computer instructions stored in the memory 282, as well as controlling the components of the UE 900 that provide the features and functionality of the UE 900. The UE 900, under control of the controller 280, transmits and receives signals via the wireless radios 901*a-r* and the antennas 252*a-r*. The wireless radios 901*a-r* include various components and hardware, as illustrated in FIG. 2 for the UE 115, including the modulator and demodulators 254*a-r*, the MIMO detector 256, the receive processor 258, the transmit processor 264, and the TX MIMO processor 266.

As shown, the memory 282 may include (or be configured to store) distance 902, threshold information 903, beam group information 904, and communication logic 905. The distance 902 may include or correspond to the distance 406 of FIG. 4. The threshold information 903 may include or correspond to the threshold information 408 of FIG. 4. The beam group information 904 may include or correspond to the beam group information 414 of FIG. 4. The communication logic 905 may be configured to enable communication between the UE 900 and one or more other devices. The UE 900 may receive signals from or transmit signals to one or more network entities, such as the base station 105 of FIGS. 1-3, the network entity 450 of FIG. 4, the network entity 602 of FIG. 6, or a network entity as illustrated in FIG. 11.

FIG. 10 is a flow diagram illustrating an example process 1000 performable by a network entity that supports improved near field communications, particularly via beam switching, according to one or more aspects of the present disclosure. Operations of the process 1000 may be performed by a network entity or its components, such as a base station or other network entity, as described herein. For example, the process 1000 may be performed by the base station 105 described above with reference to FIGS. 1-3, the network entity 450 described above with reference to FIG. 4, the network entity 602 describe above with reference to FIG. 6, or a network entity as described above with reference to FIG. 11.

At block 1002, the network entity receives, from a UE, a beam group indicator. For example, the beam group indicator may include or correspond to the beam group indicator 470 of FIG. 4. The beam group indicator indicates a first beam group of a plurality of beam groups that collectively include a plurality of candidate communication beams. Each beam group of the plurality of beam groups includes one or more respective candidate communication beams of the plurality of candidate communication beams. For example, the plurality of beam groups may be indicated by the beam group information 414 of FIG. 4.

At block 1004, the network entity communicates, at a first time, with the UE via a first beam of the one or more candidate communication beams of the first beam group in association with a distance between the UE and the network entity being greater than a first threshold of a set of one or more thresholds. For example, the communication via the first beam may include or correspond to the first communications 472 of FIG. 4, the distance may include or correspond to the distance 462 of FIG. 4, and the first threshold may include or correspond to the first threshold 410 of FIG. 4.

At block 1006, the network entity performs, at a second time in association with the distance being less than the first threshold, a beam switching operation associated with communicating with the UE via a second beam of the one or more candidate communication beams of the first beam group. For example, the communicating via the second beam may include or correspond to the second communications 474 of FIG. 4.

In some implementations, the beam group indicator includes a TCI group indicator or a QCL group indicator. For example, the beam group indicator 470 of FIG. 4 may include or correspond to a TCI group indicator or a QCL group indicator. Additionally or alternatively, the first beam may be associated with beam weights for communications in a far field range and the second beam may be associated with beam weights for communications in a near field range. For example, the respective first beams associated with the first communications 472 of FIG. 4 may be associated with beam weights designed or tailored for communications in a far field range with respect to the antenna array 459, and the respective second beams associated with the second communications 474 of FIG. 4 may be associated with beam weights designed or tailored for communications in a near field range with respect to the antenna array 459.

In some implementations, the process 1000 also includes performing, at a third time in association with the distance being less than a second threshold, of the set of one or more thresholds, that is smaller than the first threshold, a second beam switching operation associated with communicating with the UE via a third beam of the one or more candidate communication beams of the first beam group. For example, the second beam switching operation may result in performance of the additional communications 478 of FIG. 4, which in some implementations are performed in association with the distance 406 and the distance 462 falling below the second threshold 412. In some such implementations, the first beam and the second beam are associated with beam weights for communications in a far field range and the third beam is associated with beam weights for communications in a near field range. For example, the first communications 472 and the second communications 474 may be performed with respective communication beams that are designed or tailored for communications in a far field range with respect to the antenna array 459, and the additional communications 478 may be performed with respective additional communication beams that are designed or tailored for communications in a near field range with respect to the antenna array 459.

In some implementations, each beam group of the plurality of beam groups includes at least one respective beam associated with beam weights for communications in a far field range and at least one respective beam associated with beam weights for communications in a near field range. For example, each beam group indicated by the beam group information 414 of FIG. 4 may include at least one respective beam associated with beam weights for communications in a far field range with respect to the antenna array 459 and at least one respective beam associated with beam weights for communications in a near field range with respect to the antenna array 459.

In some implementations, the process 1000 also includes transmitting, in association with an association process with the UE, information that indicates the set of one or more thresholds. For example, the network entity 450 may transmit the threshold information 408 of FIG. 4 to the UE 115 during an association process between the UE 115 and the network entity 450. In some such implementations, the process 1000 further includes determining the set of one or more thresholds in association with one or more parameters of an antenna array used to communicate with the UE. For example, for example, the network entity 450 may determine the threshold information 408 of FIG. 4 based on one or more parameters or configurations of the antenna array 459. Additionally or alternatively, the process 1000 may further include negotiating, in association with the association process with the UE, assignments of the plurality of candidate communication beams to the plurality of beam groups in association with the set of one or more thresholds. For example, the assignment of candidate communication beams to the plurality of beam groups represented by the beam group information 414 of FIG. 4 may be negotiated during an association process between the UE 115 and the network entity 450.

In some implementations, the process 1000 also includes receiving an operating mode indicator that indicates a transition of the UE to an energy harvesting mode, and performing, at a third time in association with receipt of the operating mode indicator, a second beam switching operation associated with communicating with the UE via a third beam of the one or more candidate communication beams of the first beam group. The third beam is associated with beam weights for communications in a near field beam range. For example, For example, in some implementations, the UE 115 and the network entity 450 may perform the additional communications 478 of FIG. 4 using respective additional beams that result from beam switching operations performed in association with transmission of the operating mode indicator 476.

FIG. 11 is a block diagram of an example network entity 1100 that supports improved near field communications, particularly via beam switching, according to one or more aspects. The network entity 1100 may be configured to perform operations, including the blocks of process 1000 described with reference to FIG. 10. In some implementations, the network entity 1100 includes the structure, hardware, and components shown and described with reference to base station 105 of FIGS. 1-3, the network entity 450 of FIG. 4, or the network entity 602 of FIG. 6. For example, the network entity 1100 may include the controller 240, which operates to execute logic or computer instructions stored in the memory 242, as well as controlling the components of the network entity 1100 that provide the features and functionality of the network entity 1100. The network entity 1100, under control of the controller 240, transmits and receives signals via the wireless radios 1101*a-t* and the antennas 234*a-t*. The wireless radios 1101*a-t* include various components and hardware, as illustrated in FIG. 2 for the base station 105, including the modulator and demodulators the 232*a-t*, the transmit processor 220, the TX MIMO processor 230, the MIMO detector 236, and the receive processor 238.

As shown, the memory 242 may include (or be configured to store) distance 1102, threshold information 1103, beam group information 1104, and communication logic 1105. The distance 1102 may include or correspond to the distance 462 of FIG. 4. The threshold information 1103 may include or correspond to the threshold information 408 of FIG. 4. The beam group information 1104 may include or correspond to the beam group information 414 of FIG. 4. The communication logic 1105 may be configured to enable communication between network entity 1100 and one or more other devices. The network entity 1100 may receive signals from or transmit signals to one or more UEs, such as the UE 115 of FIGS. 1-7 or the UE 900 of FIG. 9.

FIG. 12 is a flow diagram illustrating an example process 1200 performable by a network entity that supports improved near field communications, particularly via changing antenna array configurations, according to one or more aspects of the present disclosure. Operations of the process 1200 may be performed by a network entity or its components, such as a base station or other network entity, as described herein. For example, the process 1200 may be performed by the base station 105 described above with reference to FIGS. 1-3, the network entity 550 described above with reference to FIG. 5, the network entity 702 describe above with reference to FIG. 7, or a network entity as described above with reference to FIG. 13.

At block 1202, the network entity communicates, at a first time, with a UE using an antenna array having a first array size in association with a distance between the UE and the network entity being greater than a first threshold of a set of one or more thresholds. For example, the antenna array may include or correspond to the antenna array 559 of FIG. 5, the distance may include or correspond to the distance 562 of FIG. 5, the communication using the antenna array having the first size may include or correspond to the first communications 570 of FIG. 5, and the first threshold may include or correspond to the first threshold 566 of FIG. 5.

At block 1204, the network entity configures, at a second time, the antenna array to have a second array size that is smaller than the first array size in association with the distance being less than the first threshold. For example, the network entity 550 of FIG. 5 may modify the array configuration information 569 to cause the antenna array 559 to have the second array size.

At block 1206, the network entity communicates with the UE in association with configuring the antenna array to have the second array size. For example, the communication using the antenna array having the second size may include or correspond to the second communications 572 of FIG. 5.

In some implementations, configuring the antenna array to have the second array size includes deactivating one or more active antenna elements of the antenna array. For example, the network entity 550 may deactivate one or more antenna elements of the antenna array 559, such as by changing the array configuration information 569, to configure the antenna array 559 from the first configuration associated with the first communications 570 to the second configuration associated with the second communications 572 of FIG. 5.

In some implementations, the process 1200 may also include increasing a gain of a power amplifier from a first gain at the first time to a second gain at the second time in association with the distance being less than the first threshold. The second gain is greater than the first gain. For example, the network entity 550 may increase a gain of the power amplifier 557 of FIG. 5 from a first gain associated with the first communications 570 to a second gain associated with the second communications 572 that is greater than the first gain. In some such implementations, a spectral efficiency realized with the antenna array associated with the first array size and the first gain is approximately equal to a spectral efficiency realized with the antenna array associated with the second array size and the second gain. For example, the first communications 570 and the second communications 572 may be associated with an approximately equal TRP point.

In some implementations, the process 1200 also includes configuring, at a third time, the antenna array to have a third array size that is smaller than the second array size in association with the distance being less than a second threshold, of the one or more thresholds, that is smaller than the first threshold, and communicating with the UE in association with configuring the antenna array to have the third array size. For example, the network entity 550 may configure the antenna array 559 of FIG. 5 to have a third configuration that is associated with a smaller array size to perform the additional communications 576 in association with the distance 562 being less than the second threshold 568. Additionally or alternatively, the process 1200 may include configuring, at a third time, the antenna array to have the first array size in association with the distance being greater than the first threshold, and communicating with the UE in association with configuring the antenna array to have the first array size. For example, the network entity 550 may configure the antenna array 559 of FIG. 5 to have the first configuration for performing the additional communications 576 in association with the distance 562 being greater than the first threshold 566 at a later time.

In some implementations, the process 1200 also includes transmitting, in association with an association process with the UE, information that indicates the set of one or more thresholds. For example, the network entity 550 may transmit the threshold information 564 of FIG. 5 to the UE 115 during an association process between the network entity 550 and the UE 115.

In some implementations, the process 1200 also includes receiving an operating mode indicator that indicates a transition of the UE to an energy harvesting mode. For example, the operating mode indicator may include or correspond to the operating mode indicator 574 of FIG. 5. In some such implementations, the process 1200 further includes configuring, at a third time, the antenna array to have a third array size that is smaller than the second array size in association with receipt of the operating mode indicator, and communicating with the UE in association with configuring the antenna array to have the third array size. For example, the network entity 550 may configure the antenna array 559 of FIG. 5 to have a third configuration that is associated with a smaller array size to perform the additional communications 576 in association with receipt of the operating mode indicator 574.

FIG. 13 is a block diagram of an example network entity 1300 that supports improved near field communications, particularly via changing antenna array configurations, according to one or more aspects. The network entity 1300 may be configured to perform operations, including the blocks of process 1200 described with reference to FIG. 12. In some implementations, the network entity 1300 includes the structure, hardware, and components shown and described with reference to base station 105 of FIGS. 1-3, the network entity 550 of FIG. 5, or the network entity 702 of FIG. 7. For example, the network entity 1300 may include the controller 240, which operates to execute logic or computer instructions stored in the memory 242, as well as controlling the components of the network entity 1300 that provide the features and functionality of the network entity 1300. The network entity 1300, under control of the controller 240, transmits and receives signals via the wireless radios 1301a-t and the antennas 234a-t. The wireless radios 1301a-t include various components and hardware, as illustrated in FIG. 2 for the base station 105, including the modulator and demodulators the 232a-t, the transmit processor 220, the TX MIMO processor 230, the MIMO detector 236, and the receive processor 238.

As shown, the memory 242 may include (or be configured to store) distance 1302, threshold information 1303, antenna configuration logic 1304, and communication logic 1305. The distance 1302 may include or correspond to the distance 562 of FIG. 5. The threshold information 1303 may include or correspond to the threshold information 564 of FIG. 5. The antenna configuration logic 1304 may be configured to enable configuration of the antennas 234a-t, the wireless radios 1301a-t, or a combination thereof. The communication logic 1305 may be configured to enable communication between network entity 1300 and one or more other devices. The network entity 1300 may receive signals from or transmit signals to one or more UEs, such as the UE 115 of FIGS. 1-7 or the UE 900 of FIG. 9.

It is noted that one or more blocks (or operations) described with reference to FIGS. 8, 10, and 12 may be combined with one or more blocks (or operations) described with reference to another of the figures. For example, one or more blocks (or operations) of FIG. 10 may be combined with one or more blocks (or operations) of FIG. 12. As another example, one or more blocks associated with FIG. 12 may be combined with one or more blocks associated with FIG. 10. As another example, one or more blocks associated with FIG. 8, 10, or 12 may be combined with one or more blocks (or operations) associated with FIGS. 1-7. Additionally, or alternatively, one or more operations described above with reference to FIGS. 1-7 may be combined with one or more operations described with reference to FIG. 9, 11, or 13.

Implementation examples are described in the following numbered clauses:

Clause 1: A UE including one or more memories storing processor-readable code and one or more processors coupled with the one or more memories and operable to cause the UE to: transmit, to a network entity, a beam group indicator, the beam group indicator indicating a first beam group of a plurality of beam groups that collectively include a plurality of candidate communication beams, each beam group of the plurality of beam groups including one or more respective candidate communication beams of the plurality of candidate communication beams; communicate, at a first time, with the network entity via a first beam of the one or more candidate communication beams of the first beam group in association with a distance between the UE and the network entity being greater than a first threshold of a set of one or more thresholds; and perform, at a second time in association with the distance being less than the first threshold, a beam switching operation associated with communicating with the network entity via a second beam of the one or more candidate communication beams of the first beam group.

Clause 2: The UE of clause 1, where the beam group indicator includes a TCI group indicator or a QCL group indicator.

Clause 3: The UE of clause 1, where the first beam is associated with beam weights for communications in a far field range and the second beam is associated with beam weights for communications in a near field range.

Clause 4: The UE of clause 1, where the one or more processors are further operable to cause the UE to: perform, at a third time in association with the distance being less than a second threshold, of the set of one or more thresholds, that is smaller than the first threshold, a second beam switching operation associated with communicating with the network entity via a third beam of the one or more candidate communication beams of the first beam group.

Clause 5: The UE of clause 4, where the first beam and the second beam are associated with beam weights for communications in a far field range and the third beam is associated with beam weights for communications in a near field range.

Clause 6: The UE of clause 1, where the one or more processors are further operable to cause the UE to: perform one or more beam sweeping operations; select the first beam from the plurality of candidate communication beams in association with one or more criteria and measurements resulting from the one or more beam sweeping operations; and select the first beam group from the plurality of beam groups in association with the first beam being in the first beam group.

Clause 7: The UE of clause 1, where each beam group of the plurality of beam groups includes at least one respective beam associated with beam weights for communications in a far field range and at least one respective beam associated with beam weights for communications in a near field range.

Clause 8: The UE of clause 1, where the one or more processors are further operable to cause the UE to: receive, in association with an association process with the network entity, information that indicates the set of one or more thresholds.

Clause 9: The UE of clause 8, where the one or more processors are further operable to cause the UE to: negotiate, in association with the association process with the network entity, assignments of the plurality of candidate communication beams to the plurality of beam groups in association with the set of one or more thresholds.

Clause 10: The UE of clause 1, where the one or more processors are further operable to cause the UE to: transmit an operating mode indicator in association with a transition to an energy harvesting mode; and perform, at a third time in association with transmission of the operating mode indicator, a second beam switching operation associated with communicating with the network entity via a third beam of the one or more candidate communication beams of the first beam group, the third beam being associated with beam weights for communications in a near field range.

Clause 11: The UE of clause 10, where the operating mode indicator includes a TCI state change indicator.

Clause 12: A network entity including one or more memories storing processor-readable code and one or more processors coupled with the one or more memories and operable to cause the network entity to: receive, from a UE, a beam group indicator, the beam group indicator indicating a first beam group of a plurality of beam groups that collectively include a plurality of candidate communication beams, each beam group of the plurality of beam groups including one or more respective candidate communication beams of the plurality of candidate communication beams; communicate, at a first time, with the UE via a first beam of the one or more candidate communication beams of the first beam group in association with a distance between the UE and the network entity being greater than a first threshold of a set of one or more thresholds; and perform, at a second time in association with the distance being less than the first threshold, a beam switching operation associated with communicating with the UE via a second beam of the one or more candidate communication beams of the first beam group.

Clause 13: The network entity of clause 12, where the beam group indicator includes a TCI group indicator or a QCL group indicator.

Clause 14: The network entity of clause 12, where the first beam is associated with beam weights for communications in a far field range and the second beam is associated with beam weights for communications in a near field range.

Clause 15: The network entity of clause 12, where the one or more processors are further operable to cause the network entity to: perform, at a third time in association with the distance being less than a second threshold, of the set of one or more thresholds, that is smaller than the first threshold, a second beam switching operation associated with communicating with the UE via a third beam of the one or more candidate communication beams of the first beam group.

Clause 16: The network entity of clause 15, where the first beam and the second beam are associated with beam weights for communications in a far field range and the third beam is associated with beam weights for communications in a near field range.

Clause 17: The network entity of clause 12, where each beam group of the plurality of beam groups includes at least one respective beam associated with beam weights for communications in a far field range and at least one respective beam associated with beam weights for communications in a near field range.

Clause 18: The network entity of clause 17, where the one or more processors are further operable to cause the network entity to: transmit, in association with an association process with the UE, information that indicates the set of one or more thresholds.

Clause 19: The network entity of clause 18, where the one or more processors are further operable to cause the network entity to: determine the set of one or more thresholds in association with one or more parameters of an antenna array used to communicate with the UE.

Clause 20: The network entity of clause 18, where the one or more processors are further operable to cause the network entity to: negotiate, in association with the association process with the UE, assignments of the plurality of candidate communication beams to the plurality of beam groups in association with the set of one or more thresholds.

Clause 21: The network entity of clause 12, where the one or more processors are further operable to cause the network entity to: receive an operating mode indicator that indicates a transition of the UE to an energy harvesting mode; and perform, at a third time in association with receipt of the operating mode indicator, a second beam switching operation associated with communicating with the UE via a third beam of the one or more candidate communication beams of the first beam group, the third beam being associated with beam weights for communications in a near field range.

Clause 22: A network entity including one or more memories storing processor-readable code and one or more processors coupled with the one or more memories and operable to cause the network entity to: communicate, at a first time, with a UE using an antenna array having a first array size in association with a distance between the UE and the network entity being greater than a first threshold of a set of one or more thresholds; configure, at a second time, the antenna array to have a second array size that is smaller than the first array size in association with the distance being less than the first threshold; and communicate with the UE in association with configuring the antenna array to have the second array size.

Clause 23: The network entity of clause 22, where the one or more processors are operable, to cause the network entity to configure the antenna array to have the second array size, to deactivate one or more active antenna elements of the antenna array.

Clause 24: The network entity of clause 22, where the one or more processors are further operable to cause the network entity to: increase a power of a power amplifier from a first gain at the first time to a second gain at the second time in association with the distance being less than the first threshold, the second gain being greater than the first gain.

Clause 25: The network entity of clause 24, where a spectral efficiency realized with the antenna array associated with the first array size and the first gain is approximately equal to a spectral efficiency realized with the antenna array associated with the second array size and the second gain.

Clause 26: The network entity of clause 22, where the one or more processors are further operable to cause the network entity to: configure, at a third time, the antenna array to have a third array size that is smaller than the second array size in association with the distance being less than a second threshold, of the set of one or more thresholds, that is smaller than the first threshold; and communicate with the UE in association with configuring the antenna array to have the third array size.

Clause 27: The network entity of clause 22, where the one or more processors are further operable to cause the network entity to: configure, at a third time, the antenna array to have the first array size in association with the distance being greater than the first threshold; and communicate with the UE in association with configuring the antenna array to have the first array size.

Clause 28: The network entity of clause 22, where the one or more processors are further operable to cause the network entity to: transmit, in association with an association process with the UE, information that indicates the set of one or more thresholds.

Clause 29: The network entity of clause 22, where the one or more processors are further configured to cause the network entity to: receive an operating mode indicator that indicates a transition of the UE to an energy harvesting mode.

Clause 30: The network entity of clause 29, where the one or more processors are further operable to cause the network entity to: configure, at a third time, the antenna array to have a third array size that is smaller than the second array size in association with receipt of the operating mode indicator; and communicate with the UE in association with configuring the antenna array to have the third array size.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-13 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, some other implementations are within the scope of the following claims. In some cases, the actions recited in the claims can be performed in a different order and still achieve desirable results.

As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

As used herein, "based on" is intended to be interpreted in the inclusive sense, unless otherwise explicitly indicated. For example, "based on" may be used interchangeably with "based at least in part on," "associated with", "in association with", or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information. Additionally, an operation a that is performed "in association with" a condition b may be performed based on the existence of condition b, responsive to condition b, in response to condition b, or otherwise due to an association or correspondence between the operation a and the condition b.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A user equipment (UE) comprising:
   one or more memories storing processor-readable code; and one or more processors coupled with the one or more memories and operable to cause the UE to:
  transmit, to a network entity, a beam group indicator, the beam group indicator indicating a first beam group of a plurality of beam groups that collectively include a plurality of candidate communication beams, each beam group of the plurality of beam groups including one or more respective candidate communication beams of the plurality of candidate communication beams;
  communicate, at a first time, with the network entity via a first beam of the one or more candidate communication beams of the first beam group in association with a distance between the UE and the network entity being greater than a first threshold of a set of one or more thresholds; and
  perform, at a second time in association with the distance being less than the first threshold, a beam switching operation associated with communicating with the network entity via a second beam of the one or more candidate communication beams of the first beam group.

2. The UE of claim 1, wherein the beam group indicator comprises a transmission configuration indicator (TCI) group indicator or a quasi co-location (QCL) group indicator.

3. The UE of claim 1, wherein the first beam is associated with beam weights for communications in a far field range and the second beam is associated with beam weights for communications in a near field range.

4. The UE of claim 1, wherein the one or more processors are further operable to cause the UE to:
  perform, at a third time in association with the distance being less than a second threshold, of the set of one or more thresholds, that is smaller than the first threshold, a second beam switching operation associated with communicating with the network entity via a third beam of the one or more candidate communication beams of the first beam group.

5. The UE of claim 4, wherein the first beam and the second beam are associated with beam weights for communications in a far field range and the third beam is associated with beam weights for communications in a near field range.

6. The UE of claim 1, wherein the one or more processors are further operable to cause the UE to:
  perform one or more beam sweeping operations;
  select the first beam from the plurality of candidate communication beams in association with one or more criteria and measurements resulting from the one or more beam sweeping operations; and
  select the first beam group from the plurality of beam groups in association with the first beam being in the first beam group.

7. The UE of claim 1, wherein each beam group of the plurality of beam groups includes at least one respective beam associated with beam weights for communications in a far field range and at least one respective beam associated with beam weights for communications in a near field range.

8. The UE of claim 1, wherein the one or more processors are further operable to cause the UE to:
  receive, in association with an association process with the network entity, information that indicates the set of one or more thresholds.

9. The UE of claim 8, wherein the one or more processors are further operable to cause the UE to:
  negotiate, in association with the association process with the network entity, assignments of the plurality of candidate communication beams to the plurality of beam groups in association with the set of one or more thresholds.

10. The UE of claim 1, wherein the one or more processors are further operable to cause the UE to:
  transmit an operating mode indicator in association with a transition to an energy harvesting mode; and
  perform, at a third time in association with transmission of the operating mode indicator, a second beam switching operation associated with communicating with the network entity via a third beam of the one or more candidate communication beams of the first beam group, the third beam being associated with beam weights for communications in a near field range.

11. The UE of claim 10, wherein the operating mode indicator comprises a transmission configuration indicator (TCI) state change indicator.

12. A network entity comprising:
  one or more memories storing processor-readable code; and
  one or more processors coupled with the one or more memories and operable to cause the network entity to:
    receive, from a user equipment (UE), a beam group indicator, the beam group indicator indicating a first beam group of a plurality of beam groups that collectively include a plurality of candidate communication beams, each beam group of the plurality of beam groups including one or more respective candidate communication beams of the plurality of candidate communication beams;
    communicate, at a first time, with the UE via a first beam of the one or more candidate communication beams of the first beam group in association with a distance between the UE and the network entity being greater than a first threshold of a set of one or more thresholds; and
    perform, at a second time in association with the distance being less than the first threshold, a beam switching operation associated with communicating with the UE via a second beam of the one or more candidate communication beams of the first beam group.

13. The network entity of claim 12, wherein the beam group indicator comprises a transmission configuration indicator (TCI) group indicator or a quasi co-location (QCL) group indicator.

14. The network entity of claim 12, wherein the first beam is associated with beam weights for communications in a far field range and the second beam is associated with beam weights for communications in a near field range.

15. The network entity of claim 12, wherein the one or more processors are further operable to cause the network entity to:
  perform, at a third time in association with the distance being less than a second threshold, of the set of one or more thresholds, that is smaller than the first threshold, a second beam switching operation associated with communicating with the UE via a third beam of the one or more candidate communication beams of the first beam group.

16. The network entity of claim 15, wherein the first beam and the second beam are associated with beam weights for communications in a far field range and the third beam is associated with beam weights for communications in a near field range.

17. The network entity of claim 12, wherein each beam group of the plurality of beam groups includes at least one respective beam associated with beam weights for communications in a far field range and at least one respective beam associated with beam weights for communications in a near field range.

18. The network entity of claim 12, wherein the one or more processors are further operable to cause the network entity to:
transmit, in association with an association process with the UE, information that indicates the set of one or more thresholds.

19. The network entity of claim 18, wherein the one or more processors are further operable to cause the network entity to:
determine the set of one or more thresholds in association with one or more parameters of an antenna array used to communicate with the UE.

20. The network entity of claim 18, wherein the one or more processors are further operable to cause the network entity to:
negotiate, in association with the association process with the UE, assignments of the plurality of candidate communication beams to the plurality of beam groups in association with the set of one or more thresholds.

21. The network entity of claim 12, wherein the one or more processors are further operable to cause the network entity to:
receive an operating mode indicator that indicates a transition of the UE to an energy harvesting mode; and
perform, at a third time in association with receipt of the operating mode indicator, a second beam switching operation associated with communicating with the UE via a third beam of the one or more candidate communication beams of the first beam group, the third beam being associated with beam weights for communications in a near field range.

22. A network entity comprising:
one or more memories storing processor-readable code; and
one or more processors coupled with the one or more memories and operable to cause the network entity to:
communicate, at a first time, with a user equipment (UE) using an antenna array having a first array size in association with a distance between the UE and the network entity being greater than a first threshold of a set of one or more thresholds;
configure, at a second time, the antenna array to have a second array size that is smaller than the first array size in association with the distance being less than the first threshold; and
communicate with the UE in association with configuring the antenna array to have the second array size.

23. The network entity of claim 22, wherein the one or more processors are operable, to cause the network entity to configure the antenna array to have the second array size, to deactivate one or more active antenna elements of the antenna array.

24. The network entity of claim 22, wherein the one or more processors are further operable to cause the network entity to:
increase a gain of a power amplifier from a first gain at the first time to a second gain at the second time in association with the distance being less than the first threshold, the second gain being greater than the first gain.

25. The network entity of claim 24, wherein a spectral efficiency realized with the antenna array associated with the first array size and the first gain is approximately equal to a spectral efficiency realized with the antenna array associated with the second array size and the second gain.

26. The network entity of claim 22, wherein the one or more processors are further operable to cause the network entity to:
configure, at a third time, the antenna array to have a third array size that is smaller than the second array size in association with the distance being less than a second threshold, of the set of one or more thresholds, that is smaller than the first threshold; and
communicate with the UE in association with configuring the antenna array to have the third array size.

27. The network entity of claim 22, wherein the one or more processors are further operable to cause the network entity to:
configure, at a third time, the antenna array to have the first array size in association with the distance being greater than the first threshold; and
communicate with the UE in association with configuring the antenna array to have the first array size.

28. The network entity of claim 22, wherein the one or more processors are further operable to cause the network entity to:
transmit, in association with an association process with the UE, information that indicates the set of one or more thresholds.

29. The network entity of claim 22, wherein the one or more processors are further configured to cause the network entity to:
receive an operating mode indicator that indicates a transition of the UE to an energy harvesting mode.

30. The network entity of claim 29, wherein the one or more processors are further operable to cause the network entity to:
configure, at a third time, the antenna array to have a third array size that is smaller than the second array size in association with receipt of the operating mode indicator; and
communicate with the UE in association with configuring the antenna array to have the third array size.

* * * * *